United States Patent
Pogodin

(10) Patent No.: US 8,572,043 B2
(45) Date of Patent: Oct. 29, 2013

(54) METHOD AND SYSTEM FOR STORAGE OF UNSTRUCTURED DATA FOR ELECTRONIC DISCOVERY IN EXTERNAL DATA STORES

(75) Inventor: Andrey Pogodin, San Mateo, CA (US)

(73) Assignee: International Business Machines Corporation, Armonk, NY (US)

(*) Notice: Subject to any disclaimer, the term of this patent is extended or adjusted under 35 U.S.C. 154(b) by 494 days.

(21) Appl. No.: 12/039,541

(22) Filed: Feb. 28, 2008

(65) Prior Publication Data

US 2009/0164790 A1 Jun. 25, 2009

Related U.S. Application Data

(60) Provisional application No. 61/015,635, filed on Dec. 20, 2007.

(51) Int. Cl.
*G06F 7/00* (2006.01)
(52) U.S. Cl.
USPC ........................... 707/661; 707/942; 707/690
(58) Field of Classification Search
USPC ......................................... 707/640, 690, 942
See application file for complete search history.

(56) References Cited

U.S. PATENT DOCUMENTS

| | | | |
|---|---|---|---|
| 5,313,609 A * | 5/1994 | Baylor et al. | ................. 711/121 |
| 5,355,497 A | 10/1994 | Cohen-Levy | |
| 5,608,865 A | 3/1997 | Midgely et al. | |
| 5,701,472 A | 12/1997 | Koerber et al. | |
| 5,875,431 A | 2/1999 | Heckman et al. | |
| 5,903,879 A | 5/1999 | Mitchell | |
| 6,115,642 A | 9/2000 | Brown et al. | |
| 6,128,620 A | 10/2000 | Pissanos et al. | |
| 6,151,031 A | 11/2000 | Atkins et al. | |
| 6,173,270 B1 | 1/2001 | Cristofich et al. | |
| 6,330,572 B1 | 12/2001 | Sitka | |
| 6,332,125 B1 | 12/2001 | Callen et al. | |
| 6,343,287 B1 * | 1/2002 | Kumar et al. | .......... 707/999.004 |
| 6,401,079 B1 | 6/2002 | Kahn et al. | |
| 6,425,764 B1 | 7/2002 | Lamson | |
| 6,539,379 B1 | 3/2003 | Vora et al. | |
| 6,553,365 B1 | 4/2003 | Summerlin et al. | |
| 6,607,389 B2 | 8/2003 | Genevie | |
| 6,622,128 B1 | 9/2003 | Bedell et al. | |
| 6,738,760 B1 * | 5/2004 | Krachman | ............................ 1/1 |

(Continued)

OTHER PUBLICATIONS

Zhu et al., SIGMOD '05, Jun. 14-16, 2005, Baltimore, Maryland, USA, pp. 395-406.*

(Continued)

*Primary Examiner* — Cheyne Ly
(74) *Attorney, Agent, or Firm* — Shumaker & Sieffert, P.A.

(57) ABSTRACT

A method and system for storage of unstructured data in external data storage uses low-cost, minimally-functional external data stores (EDS) to store immutable, unstructured content. An external storage layer (ESL) interposed between an e-discovery management application (EMA), and the EDS constitutes an intermediary allowing access to external storage from the EMA and adding functionality unavailable on EDSs, offsetting the functional sacrifice incurred by using the EDS and preserving cost advantage. Caching content on the ESL during propagation to the EDS eliminates latency during file propagation. The ESL creates metadata and maintains an index of the data, allowing the data owner to search and retrieve from the EDS. The ESL compresses, decompresses, encrypts and decrypts data. An ESL vendor can service a number of clients on a fee or subscription basis. The ESL can distribute client data across EDSs and mirror data stored on a first ESL on another ESL.

24 Claims, 15 Drawing Sheets

(56) References Cited

U.S. PATENT DOCUMENTS

| | | |
|---|---|---|
| 6,805,351 B2 | 10/2004 | Nelson |
| 6,832,205 B1 | 12/2004 | Aragones et al. |
| 6,839,682 B1 | 1/2005 | Blume et al. |
| 6,944,597 B2 | 9/2005 | Callen et al. |
| 6,966,053 B2 | 11/2005 | Paris et al. |
| 6,976,083 B1 | 12/2005 | Baskey et al. |
| 7,076,439 B1 | 7/2006 | Jaggi |
| 7,103,602 B2 | 9/2006 | Black et al. |
| 7,104,416 B2 | 9/2006 | Gasco et al. |
| 7,107,416 B2 | 9/2006 | Stuart et al. |
| 7,127,470 B2 | 10/2006 | Takeya |
| 7,162,427 B1 | 1/2007 | Myrick et al. |
| 7,197,716 B2 | 3/2007 | Newell |
| 7,206,789 B2 | 4/2007 | Hurmiz et al. |
| 7,225,249 B1 | 5/2007 | Barry et al. |
| 7,233,959 B2 | 6/2007 | Kanellos |
| 7,236,953 B1 | 6/2007 | Cooper et al. |
| 7,281,084 B1 | 10/2007 | Todd et al. |
| 7,283,985 B2 | 10/2007 | Schauerte et al. |
| 7,284,985 B2 | 10/2007 | Genevie |
| 7,333,989 B1 | 2/2008 | Sameshima et al. |
| 7,386,468 B2 | 6/2008 | Calderaro et al. |
| 7,433,832 B1 | 10/2008 | Bezos et al. |
| 7,451,155 B2 | 11/2008 | Slackman et al. |
| 7,478,096 B2 | 1/2009 | Margolus et al. |
| 7,496,534 B2 | 2/2009 | Olsen et al. |
| 7,502,891 B2 | 3/2009 | Shachor |
| 7,512,636 B2 | 3/2009 | Verma et al. |
| 7,558,853 B2 | 7/2009 | Alcorn et al. |
| 7,580,961 B2 | 8/2009 | Todd et al. |
| 7,594,082 B1 | 9/2009 | Kilday et al. |
| 7,596,541 B2 | 9/2009 | deVries et al. |
| 7,720,825 B2 | 5/2010 | Pelletier et al. |
| 7,730,148 B1 | 6/2010 | Mace et al. |
| 7,742,940 B1 | 6/2010 | Shan et al. |
| 7,778,976 B2 | 8/2010 | D'Souza et al. |
| 7,895,229 B1 | 2/2011 | Paknad |
| 2001/0053967 A1 | 12/2001 | Gordon et al. |
| 2002/0007333 A1 | 1/2002 | Scolnik et al. |
| 2002/0010708 A1 | 1/2002 | McIntosh |
| 2002/0022982 A1 | 2/2002 | Cooperstone et al. |
| 2002/0035480 A1 | 3/2002 | Gordon et al. |
| 2002/0083090 A1 | 6/2002 | Jeffrey et al. |
| 2002/0091553 A1 | 7/2002 | Callen et al. |
| 2002/0095416 A1 | 7/2002 | Schwols |
| 2002/0103680 A1 | 8/2002 | Newman |
| 2002/0108104 A1 | 8/2002 | Song et al. |
| 2002/0119433 A1 | 8/2002 | Callender |
| 2002/0120859 A1 | 8/2002 | Lipkin et al. |
| 2002/0123902 A1 | 9/2002 | Lenore et al. |
| 2002/0143595 A1 | 10/2002 | Frank et al. |
| 2002/0143735 A1 | 10/2002 | Ayi et al. |
| 2002/0147801 A1 | 10/2002 | Gullotta et al. |
| 2002/0162053 A1 | 10/2002 | Os |
| 2002/0178138 A1 | 11/2002 | Ender et al. |
| 2002/0184068 A1 | 12/2002 | Krishnan et al. |
| 2002/0184148 A1 | 12/2002 | Kahn et al. |
| 2003/0004985 A1 | 1/2003 | Kagimasa et al. |
| 2003/0014386 A1 | 1/2003 | Jurado |
| 2003/0018520 A1 | 1/2003 | Rosen |
| 2003/0031991 A1 | 2/2003 | Genevie |
| 2003/0033295 A1 | 2/2003 | Adler et al. |
| 2003/0036994 A1 | 2/2003 | Witzig et al. |
| 2003/0046287 A1 | 3/2003 | Joe |
| 2003/0051144 A1 | 3/2003 | Williams |
| 2003/0069839 A1 | 4/2003 | Whittington et al. |
| 2003/0074354 A1 | 4/2003 | Lee et al. |
| 2003/0097342 A1 | 5/2003 | Whittington |
| 2003/0110228 A1 | 6/2003 | Xu et al. |
| 2003/0139827 A1 | 7/2003 | Phelps |
| 2003/0208689 A1* | 11/2003 | Garza ............................ 713/201 |
| 2003/0229522 A1 | 12/2003 | Thompson et al. |
| 2004/0002044 A1 | 1/2004 | Genevie |
| 2004/0019496 A1 | 1/2004 | Angle et al. |
| 2004/0034659 A1 | 2/2004 | Steger |
| 2004/0039933 A1 | 2/2004 | Martin et al. |
| 2004/0060063 A1 | 3/2004 | Russ et al. |
| 2004/0068432 A1 | 4/2004 | Meyerkopf et al. |
| 2004/0078368 A1 | 4/2004 | Excoffier et al. |
| 2004/0088283 A1 | 5/2004 | Lissar et al. |
| 2004/0088332 A1 | 5/2004 | Lee et al. |
| 2004/0088729 A1 | 5/2004 | Petrovic et al. |
| 2004/0103284 A1 | 5/2004 | Barker |
| 2004/0133573 A1 | 7/2004 | Miloushev et al. |
| 2004/0138903 A1 | 7/2004 | Zuniga |
| 2004/0143444 A1 | 7/2004 | Opsitnick et al. |
| 2004/0187164 A1 | 9/2004 | Kandasamy et al. |
| 2004/0193703 A1 | 9/2004 | Loewy et al. |
| 2004/0204947 A1 | 10/2004 | Li et al. |
| 2004/0215619 A1 | 10/2004 | Rabold |
| 2004/0216039 A1 | 10/2004 | Lane et al. |
| 2004/0260569 A1 | 12/2004 | Bell et al. |
| 2005/0060175 A1 | 3/2005 | Farber et al. |
| 2005/0071251 A1 | 3/2005 | Linden et al. |
| 2005/0074734 A1 | 4/2005 | Randhawa |
| 2005/0114241 A1 | 5/2005 | Hirsch et al. |
| 2005/0144114 A1 | 6/2005 | Ruggieri et al. |
| 2005/0160361 A1 | 7/2005 | Young |
| 2005/0165734 A1 | 7/2005 | Vicars et al. |
| 2005/0187813 A1 | 8/2005 | Genevie |
| 2005/0203821 A1 | 9/2005 | Petersen et al. |
| 2005/0240578 A1 | 10/2005 | Biederman, Sr. et al. |
| 2005/0283346 A1 | 12/2005 | Elkins, II et al. |
| 2006/0036464 A1 | 2/2006 | Cahoy et al. |
| 2006/0036649 A1 | 2/2006 | Simske et al. |
| 2006/0074793 A1 | 4/2006 | Hibbert et al. |
| 2006/0095421 A1 | 5/2006 | Nagai et al. |
| 2006/0095687 A1* | 5/2006 | Hsu et al. ........................ 711/152 |
| 2006/0126657 A1 | 6/2006 | Beisiegel et al. |
| 2006/0136435 A1 | 6/2006 | Nguyen et al. |
| 2006/0143248 A1 | 6/2006 | Nakano et al. |
| 2006/0143464 A1 | 6/2006 | Ananthanarayanan et al. |
| 2006/0149407 A1 | 7/2006 | Markham et al. |
| 2006/0149735 A1 | 7/2006 | DeBie et al. |
| 2006/0156381 A1 | 7/2006 | Motoyama |
| 2006/0156382 A1 | 7/2006 | Motoyama |
| 2006/0167704 A1 | 7/2006 | Nicholls et al. |
| 2006/0174320 A1 | 8/2006 | Maru et al. |
| 2006/0178917 A1 | 8/2006 | Merriam et al. |
| 2006/0184718 A1 | 8/2006 | Sinclair |
| 2006/0229999 A1 | 10/2006 | Dodell et al. |
| 2006/0230044 A1 | 10/2006 | Utiger |
| 2006/0235899 A1 | 10/2006 | Tucker |
| 2006/0242001 A1 | 10/2006 | Heathfield |
| 2007/0016546 A1 | 1/2007 | De Vorchik et al. |
| 2007/0048720 A1 | 3/2007 | Billauer |
| 2007/0061156 A1 | 3/2007 | Fry et al. |
| 2007/0061157 A1 | 3/2007 | Fry et al. |
| 2007/0078900 A1 | 4/2007 | Donahue |
| 2007/0099162 A1 | 5/2007 | Sekhar |
| 2007/0100857 A1 | 5/2007 | DeGrande et al. |
| 2007/0112783 A1* | 5/2007 | McCreight et al. ............. 707/10 |
| 2007/0156418 A1 | 7/2007 | Richter et al. |
| 2007/0162417 A1 | 7/2007 | Cozianu et al. |
| 2007/0179829 A1 | 8/2007 | Laperi et al. |
| 2007/0203810 A1 | 8/2007 | Grichnik |
| 2007/0208690 A1 | 9/2007 | Schneider et al. |
| 2007/0219844 A1 | 9/2007 | Santorine et al. |
| 2007/0220435 A1 | 9/2007 | Sriprakash et al. |
| 2007/0271308 A1 | 11/2007 | Bentley et al. |
| 2007/0271517 A1 | 11/2007 | Finkelman et al. |
| 2007/0282652 A1 | 12/2007 | Childress et al. |
| 2007/0288659 A1* | 12/2007 | Zakarian et al. ............. 709/246 |
| 2008/0033904 A1 | 2/2008 | Ghielmetti et al. |
| 2008/0034003 A1 | 2/2008 | Stakutis et al. |
| 2008/0059265 A1 | 3/2008 | Biazetti et al. |
| 2008/0059543 A1 | 3/2008 | Engel |
| 2008/0070206 A1 | 3/2008 | Perilli |
| 2008/0126156 A1 | 5/2008 | Jain et al. |
| 2008/0148346 A1 | 6/2008 | Gill et al. |
| 2008/0154969 A1 | 6/2008 | DeBie |
| 2008/0154970 A1 | 6/2008 | DeBie |
| 2008/0177790 A1 | 7/2008 | Honwad |
| 2008/0195597 A1 | 8/2008 | Rosenfeld et al. |

(56) References Cited

U.S. PATENT DOCUMENTS

| | | | |
|---|---|---|---|
| 2008/0229037 A1* | 9/2008 | Bunte et al. | 711/162 |
| 2008/0294674 A1 | 11/2008 | Reztlaff et al. | |
| 2008/0301207 A1 | 12/2008 | Demarest et al. | |
| 2008/0312980 A1 | 12/2008 | Boulineau et al. | |
| 2008/0319958 A1 | 12/2008 | Bhattacharya et al. | |
| 2008/0319984 A1* | 12/2008 | Proscia et al. | 707/5 |
| 2009/0037376 A1 | 2/2009 | Archer et al. | |
| 2009/0043625 A1 | 2/2009 | Yao | |
| 2009/0094228 A1 | 4/2009 | Bondurant et al. | |
| 2009/0106815 A1 | 4/2009 | Brodie et al. | |
| 2009/0119677 A1 | 5/2009 | Stefansson et al. | |
| 2009/0150168 A1 | 6/2009 | Schmidt | |
| 2009/0150866 A1 | 6/2009 | Schmidt | |
| 2009/0150906 A1* | 6/2009 | Schmidt et al. | 719/317 |
| 2009/0193210 A1 | 7/2009 | Hewett et al. | |
| 2009/0249446 A1 | 10/2009 | Jenkins et al. | |
| 2010/0070315 A1 | 3/2010 | Lu et al. | |

OTHER PUBLICATIONS

Human Capital Mangement; "mySAP . . . management"; retrieved from archive.org Aug. 18, 2009 www.sap.com.

Zhu, et al.; "Query Expansion Using Web Access Log Files"; Lecture Notes in Computer Science, 2005, vol. 3588/2005, pp. 686-695, Springer-Verlag Berlin Hedelberg.

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc., Preservation Benchmarks for 2007 and Beyond, www.pss-systems.com, pp. 1-3 (2007).

PSS Sytems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

www.pss-systems.com; retrieved from www.Archive.org any linkage dated Dec. 8, 2005, 131 pages.

PSS Systems, Inc., Litigation Communications and Collections, www.pss-systems.com (2006), retrieved online on Dec. 8, 2010 from archive.org, 1 page.

JISC infoNet. HEI Records Management: Guidance on Developing a File Plan. Jan 1, 2007, 7 pages.

Cohasset Associates, Inc. "Compliance Requirements Assessment, IBM DB2 Records Manager and Record-Enabled Solutions", Oct. 31, 2004, Chicago, IL., 54 pages.

\* cited by examiner

METHOD AND SYSTEM FOR STORAGE OF UNSTRUCTURED DATA FOR ELECTRONIC DISCOVERY IN EXTERNAL DATA STORES

CROSS REFERENCE TO RELATED APPLICATION

This application claims benefit of U.S. provisional patent application Ser. No. 61/015,635, filed Dec. 20, 2007, which is incorporated herein in its entirety be this reference thereto.

BACKGROUND OF THE INVENTION

1. Field of the Invention

The invention relates in general to the field of electronic data discovery (e-discovery). More particularly, the invention relates to methods and systems for storing electronic content in e-discovery management systems.

2. Background Discussion

Electronic discovery, also referred to as e-discovery or EDiscovery, concerns discovery in civil litigation, as well as tax, government investigation, and criminal proceedings, which deals with information in electronic form. In this context, electronic form is the representation of information as binary numbers. Electronic information is different from paper information because of its intangible form, volume, transience, and persistence. Also, electronic information is usually accompanied by metadata, which is rarely present in paper information. Electronic discovery poses new challenges and opportunities for attorneys, their clients, technical advisors, and the courts, as electronic information is collected, reviewed, and produced. Electronic discovery is the subject of amendments to the Federal Rules of Civil Procedure which are effective Dec. 1, 2006. In particular, for example, but not by way of limitation, Rules 16 and 26 are of interest to electronic discovery.

Examples of the types of data included in e-discovery include e-mail, instant messaging chats, Microsoft Office files, accounting databases, CAD/CAM files, Web sites, and any other electronically-stored information which could be relevant evidence in a law suit. Also included in e-discovery is raw data which forensic investigators can review for hidden evidence. The original file format is known as the native format. Litigators may review material from e-discovery in any one or more of several formats, for example, printed paper, native file, or as TIFF images.

The revisions to the Federal Rules formally address e-discovery and in the process, have made it a nearly certain element of litigation. For corporations, the rules place a very early focus on existing retention practices and the preservation and discovery of information. In response to the climate change in the e-discovery arena, corporations are 1) enhancing their processes for issuing legal holds and tracking collections, 2) looking for ways to reduce the costs of collecting, processing and reviewing electronic data, and 3) looking upstream to reduce the volume of unneeded data through better retention policies that are routinely enforced. The new field of e-discovery management has emerged to assist companies that are overwhelmed by the requirements imposed by the new rules and the spate of legal and regulatory activity regarding e-discovery.

Currently, e-discovery management applications (EMA) rely on a variety of approaches to store electronic data for e-discovery, as shown in FIG. 1A-C:

A. EMAs 101A store content as binary objects 102A in a database 103. Transaction information as well as file collections are typically stored in the same relational database 103 located on a database server;

B. EMAs 101B store content as content objects 102B in a content management system 104. EMAs can use a content management system (such as EMC DOCUMENTUM, EMC CORPORATION, Hopkinton, Mass.) to store unstructured content; and C. EMAs 101C can use a local or networked file system 105 to store content as files 102C in a file system and a database to store file metadata.

Such conventional methods provide convenience and functionality, such as allowing the data to be updated, allowing it to be checked in and checked out, and so on. However, data stored for the purpose of e-discovery typically has the character of being immutable and unstructured: the data is going to be permanently stored, or at least for a very long time; it is not going to be changed or updated or checked-in or -out very often and it is typically unnecessary to organize or structure the data in a database or content base. In view of the immutable, unstructured nature of e-discovery data, such conventional storage approaches, in spite of their convenience and functionality, involve a number of disadvantages:

High hardware cost: Databases, content management systems, and local file systems are usually stored in arrays of hard disks. The high hardware expense may be justified for transactional data, but it is exorbitant in the case of the immutable, unstructured content typically used in e-discovery;

High maintenance cost: In all of the above scenarios, maintenance requires a skilled administrator. In the case of a database, the administrator must be trained in database technology; in case of a content management system (which usually resides on top of a database), the administrator must also be skilled in content management systems. These maintenance costs may amount to hundreds of thousands of dollars in salary and thousands in training costs. As above, such expense may be justified for transactional data but is needless in the case immutable unstructured content;

Extra IT (information technology) planning and coordination: Necessary disk space must be projected and purchased upfront, requiring close involvement of IT personnel, e.g. coordination between parties such as the Chief Legal Officer and the Chief Information Officer;

High capital investment: To ensure available disk space, the company has to buy more disk space than it needs at any particular time; and Inefficiencies in cost accounting: It would be beneficial to treat storage as a cost related to a particular litigation matter as opposed to a capital expense.

Thus, there exists a need to provide a way of storing collected content in e-discovery applications that eliminates unnecessary expense and managerial and administrative overhead, achieving cost savings and simplifying operations. From an EMA vendor standpoint, it would be desirable for companies to be able to redirect a portion of their storage budgets away from purchase of storage hardware and software to purchasing low-cost storage from the EMA vendor.

SUMMARY

A method and system for storage of unstructured data in external data storage uses low-cost, minimally-functional external data stores (EDS) to store immutable, unstructured content. An external storage layer (ESL) interposed between an e-discovery management application (EMA) and the EDS constitutes an intermediary allowing access to external storage from the EMA and adding functionality unavailable on EDSs, offsetting the functional sacrifice incurred by using the EDS and preserving cost advantage. Caching content on the ESL during propagation to the EDS eliminates latency during file propagation. The ESL maintains content metadata and maintains an index of the data, allowing the data owner to search and retrieve from the EDS. The ESL compresses, decompresses, encrypts and decrypts data. An ESL vendor can service a number of clients on a fee or subscription basis. The ESL can distribute client data across EDSs and mirror data stored on a first EDS on another EDS.

DETAILED DESCRIPTION

Figure 1:
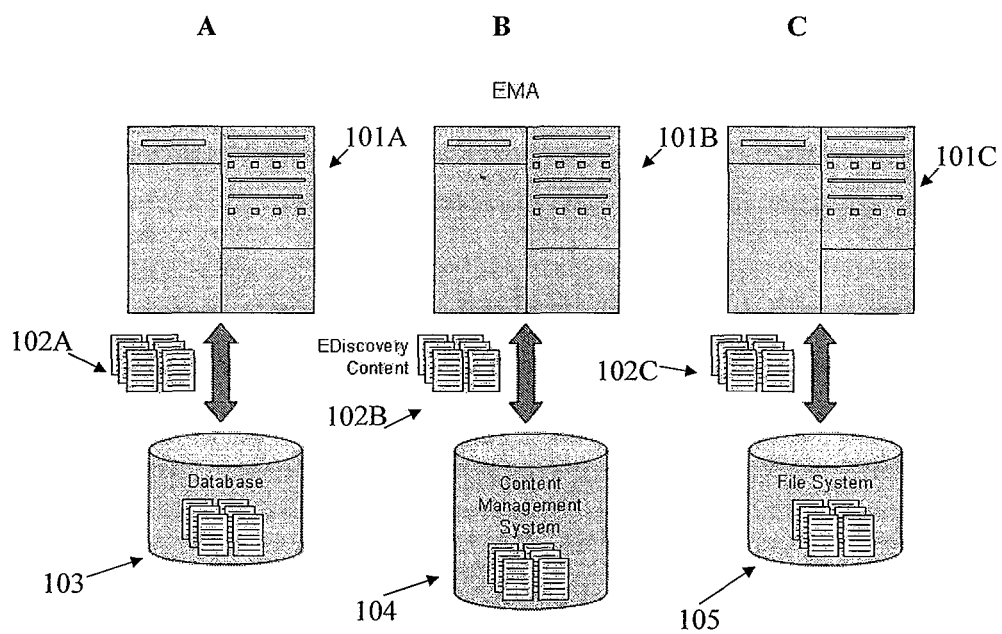
FIG. 1 provides a diagram illustrating various approaches to storage of unstructured information.

A method and system for storage of unstructured data in external data storage uses low-cost, minimally-functional external data stores (EDS) to store immutable, unstructured content. An external storage layer (ESL) interposed between an e-discovery management application (EMA) and the EDS constitutes an intermediary allowing access to external storage from the EMA and adding functionality unavailable on EDSs, offsetting the functional sacrifice incurred by using the EDS and preserving cost advantage. Caching content on the ESL during propagation to the EDS eliminates latency during file propagation. The ESL maintains file metadata and maintains an index of the data, allowing the data owner to search and retrieve from the EDS. The ESL compresses, decompresses, encrypts and decrypts data. An ESL vendor can service a number of clients on a fee or subscription basis. The ESL can distribute client data across EDSs and mirror data stored on a first ESL on another ESL.

DEFINITIONS

External data store (EDS): external file storage, usually, but not necessarily, remotely hosted, somewhere on the Internet, for example, and loosely connected to an e-discovery management application (EMA). A typical example of an EDS is the AMAZON S3 (Simple Storage Service) (AMAZON.COM, INC., Seattle, Wash.) that can be accessed by clients over the Internet by means of a protocol such as HTTP, HTTPS or BITTORRENT (BITTORRENT, INC., San Francisco, Calif.).

Such external data stores are intended by the provider simply as very low-cost, minimally-functional mass data storage. In order to minimize the cost and technical complexity of such EDSs, they typically have, in contrast to a typical local or networked file system, at least one of the following functional limitations:

the EDS may not allow reading files immediately after the files are written into the store because files need to be "propagated" inside the EDS before they become available for download;

the EDS may not allow search and indexing of content;

the EDS might have limitations on maximum and minimum file sizes, partitioning, security permissions and other features taken for granted in local file systems, databases, and content management systems;

reading files from the EDS may be slow because of network latency and the way the EDS is designed; and the intended function of the EDS is to store and retrieve unstructured files in a non time-critical manner.

In separate embodiments, similar data storage is hosted by the client itself or by an EMA Vendor. The ordinarily-skilled practitioner will recognize that such EDSs are often referred to in the art as "cloud storage."

E-Discovery Management Application (EMA) is a software application aimed to orchestrate e-discovery activities and to store and/or process documents obtained during e-discovery. A typical EMA is ATLAS LCC (PSS SYSTEMS, Mountain View Calif.). In one embodiment, a single instance of an EMA is run by a single client. In other embodiments, multi-tenant EMAs are provided, for example by an application service provider.

EDS Storage Layer (referred to as ESL) is a software module that resides between EMA on the one side and EDS on the other side and provides services described below, necessary for all the parts of the system to work together. Different embodiments of the ESL are described herein, among them:

EMA's own local ESL (LESL) that resides together with EMA and in fact is a part of EMA. For purposes of description, herein the LESL has been logically separated from the rest of the EMA;

Multi-tenant ESL (MESL) that is shared between multiple instances of EMA. MESL is preferably hosted remotely from EMA, for example on an MESL vendor's co-location, accessible over a publicly-available network such as the Internet;

A multi-tenant ESL may be attached to one or more multi-tenant EMAs. In such configuration, the EMA will be hosted by an application service provider. The ESL may be hosted by the application service provider, or by yet another party—an ESL vendor;

Finally, LESL may exist remotely from EMA in the same way as MESL, on the Internet, for example. In this embodiment, the remote LESL provides most or all of the capabilities of a MESL. Herein, the term "remote ESL" is used to collectively refer to both remote LESL and MESL.

The term "ESL" is used to refer to all possible embodiments of the ESL.

Metadata: Within the present context, the term "metadata" is used to denote information about a file such as file creation, modification, and last access dates; file name and original path, which may include the computer the file was downloaded from and the user and/or group that owned the file. Accordingly, within the present context, metadata comprises all data about the file, but not the contents of the file itself. Thus, as used herein, metadata and data contained in a full-text index are to be considered distinct from each other.

While the foregoing EDS has been described as having marked functional limitation, this very limitation leads to numerous advantages for parties wishing to store large amounts of unstructured, immutable data, such as content being archived to satisfy e-discovery requirements in the event of litigation. This kind of content is immutable (will not be updated once inserted), it is not being constantly read by the EMA during operation, and it does not require immediate retrieval once it is created. Thus, the main functional limitations of EDS (remote location, propagation time, and access speed) do not impair EDS's ability to store such content efficiently. On the other hand, by storing such content in EDS, the content owner and/or vendor achieves cost savings and other advantages typical for EDS:

substantially lower total cost hardware/software cost: EDSs are often designed as distributed clouds using inexpensive storage hardware, which results in low hardware and software costs.

significant economies of scale: EDSs are often hosted by large storage vendors who enjoy substantial economies of scale in machinery and human resources, as well as better-trained IT (information technology) personnel;

virtually unlimited storage capacity on demand; and flat pricing proportional to amount of data stored and amount of traffic.

Figure 2:
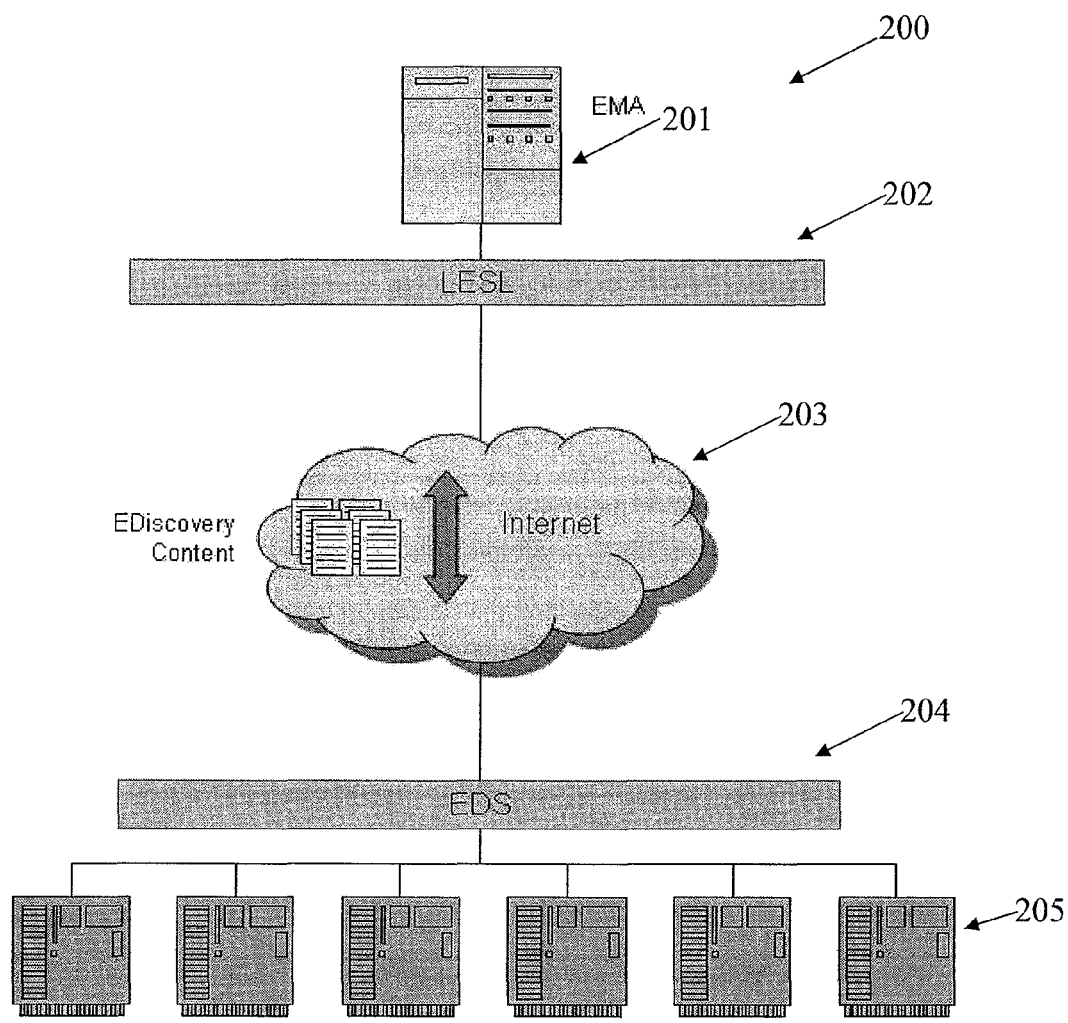
FIG. 2 provides a schematic diagram of an e-discovery management system having a local storage layer attached to an e-discovery management application (EMA)

Turning now to FIG. 2, shown is a schematic diagram of an e-discovery management system 200 having a local external storage layer (LESL) 202 attached to an e-discovery management application (EMA) 201. In one embodiment, the EMA 201 and the LESL 202 may, in fact, constitute a single software application, the single software application encompassing separate logical units, the EMA 201 and the LESL 202. Preferably, the EMA 210 and LESL 202 are hosted and executed on a computing device in the physical control either of an EMA vendor or of the owner of the content to be stored. In another embodiment, the EMA 201 and the LESL 202 may be hosted and executed on the same computing device, but constitute separate software applications that, nevertheless cooperate functionally and exchange data.

An operator, for example, the content owner, using the EMA 201, and through the intermediation of the LESL 202 transfers e-discovery content for storage in an EDS 204 by means of a network such as the Internet.

Content files collected during e-discovery, such as content evidence collected from data sources, interview results, generated reports, file attachments, audit trail information and other similar content can be stored by the EMA 201 in an EDS 204 instead of local storage hardware/software possibly including metadata, and full-text index.

Content of such type is immutable—that is, it will not be updated once inserted; it is not being constantly read by the EMA 201 during operation; and it does not require immediate retrieval once it is created. Thus, the main functional limitations of EDS (remote location, propagation time, and access speed) do not impair EDS's ability to store such content efficiently. On the other hand, by storing such content in an EDS, the EMA vendor achieves cost savings and other advantages typical for EDS.

The LESL allows access to the EDS from the EMA, at the same time adding functionality unavailable on EDSs, such as the ability to encrypt and compress content, security features and caching to eliminate the latency caused by propagating the data to the EDS. Thus, the content owner, by means of the LESL is enabled to partially offset the functional sacrifice incurred by using the EDS while preserving the cost advantage and technical simplicity. More will be said about the particular features of the ESL herein below.

As shown in FIG. 2, the EDS 204 is shown as a single entity. However, also as shown, although the EDS is logically a single entity, in actual fact, the EDS may actually be made up of a cloud or grid of computational devices, such as servers 205, each housing one or more storage units, such as drives. Virtualization may be employed to cause a grid of many computational devices to appear as a single resource. Additionally, virtualization can be employed to cause a single computational device to appear as a number of independent resources.

Figure 3:
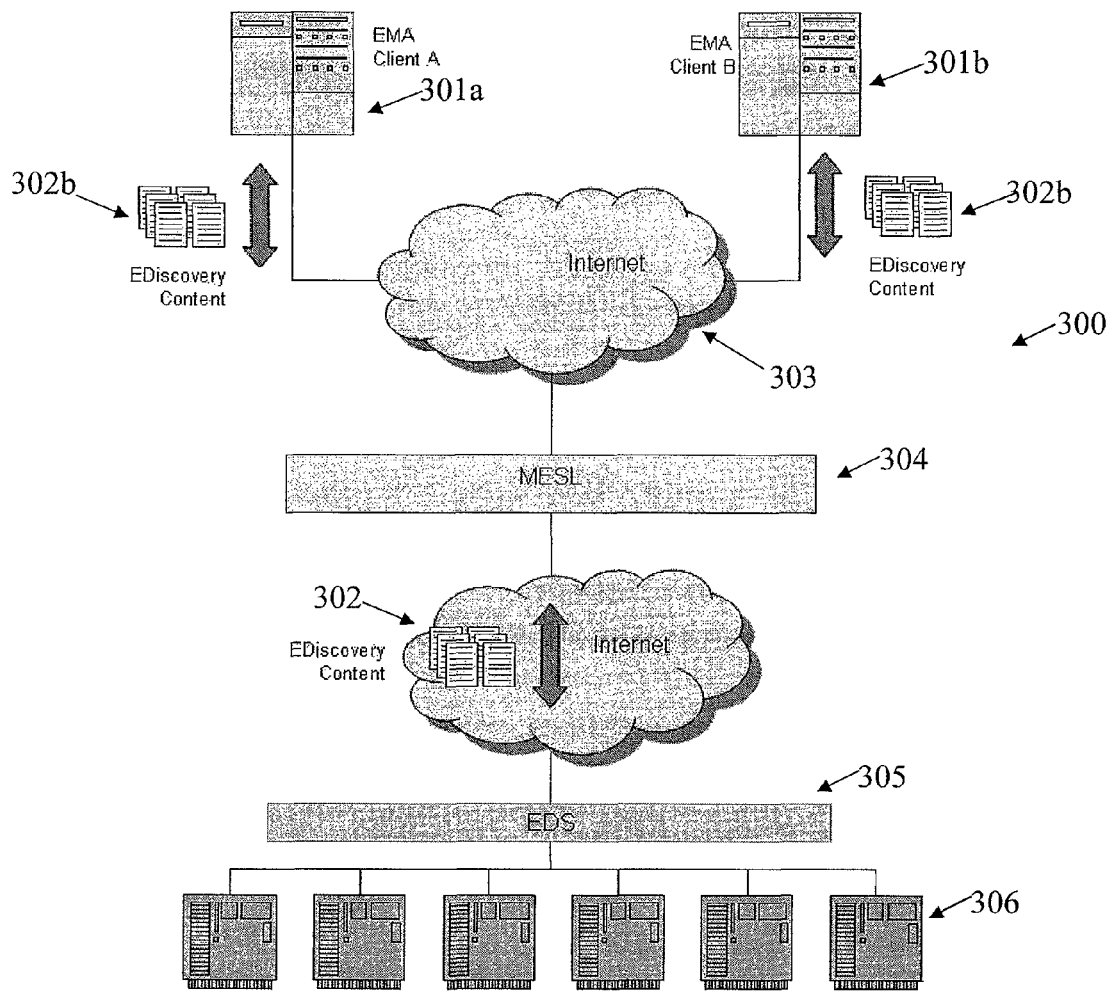
FIG. 3 provides a diagram of an e-discovery management system having a multi-tenant external data store storage layer (MESL) servicing a plurality of EMAs.

Referring now to FIG. 3, shown is a schematic diagram of an e-discovery management system 300 having a multi-tenant external storage layer (MESL) 304 servicing a plurality of EMAs 301a, 301b. As shown, the MESL 304 is preferably hosted remotely from clients A and B, but services both of clients A and B. At client A, an operator, by means of EMA 301, transfers e-discovery content 302a to an EDS by means of the MESL 304. Client B transfers content 302b for storage in the same manner as client A. Being remotely hosted, the MESL is not only logically distinct but physically distinct from the EMA 301a, 301b, thus requiring a network medium to transfer the e-discovery content 302 between system components. Through the intermediation of the MESL 304, the e-discovery content 302 is propagated and stored at the EDS 305. As in FIG. 2, the EDS may be a single logical entity made up of number of physical storage entities 306.

Figure 4:
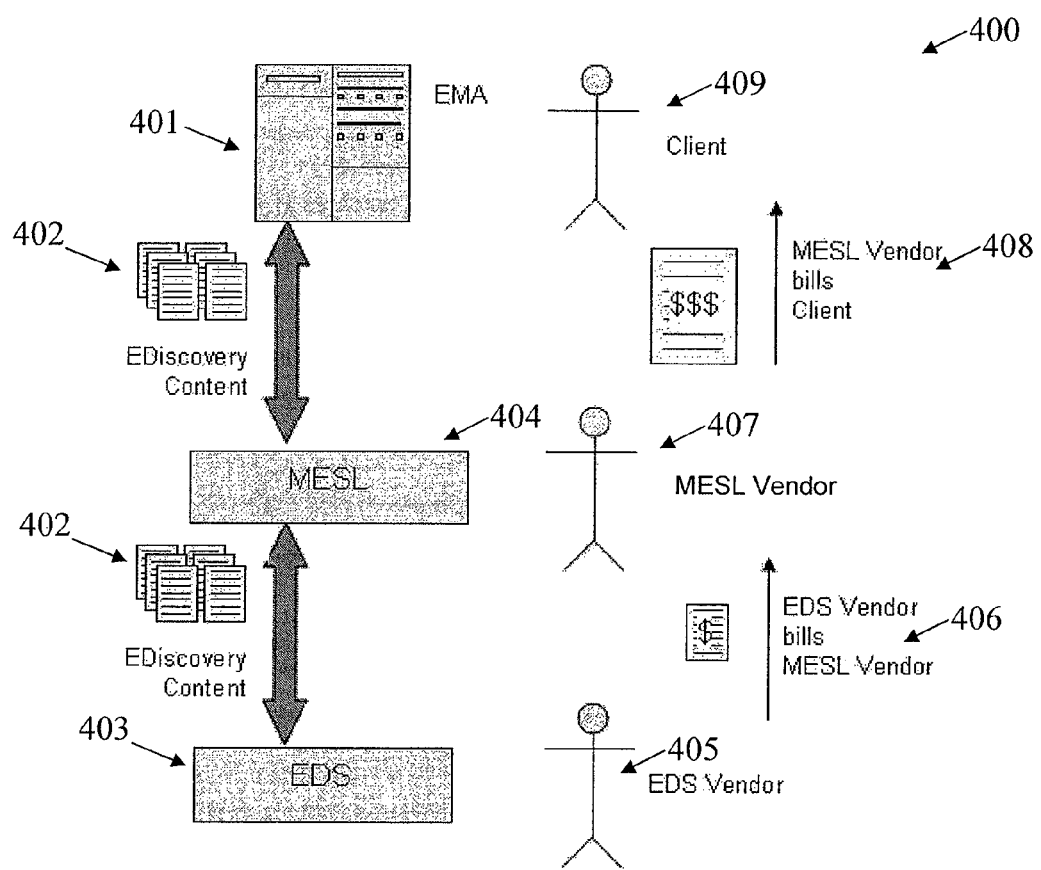
FIG. 4 shows a diagram of a method of providing storage service to a client by an MESL vendor.
Figure 5:
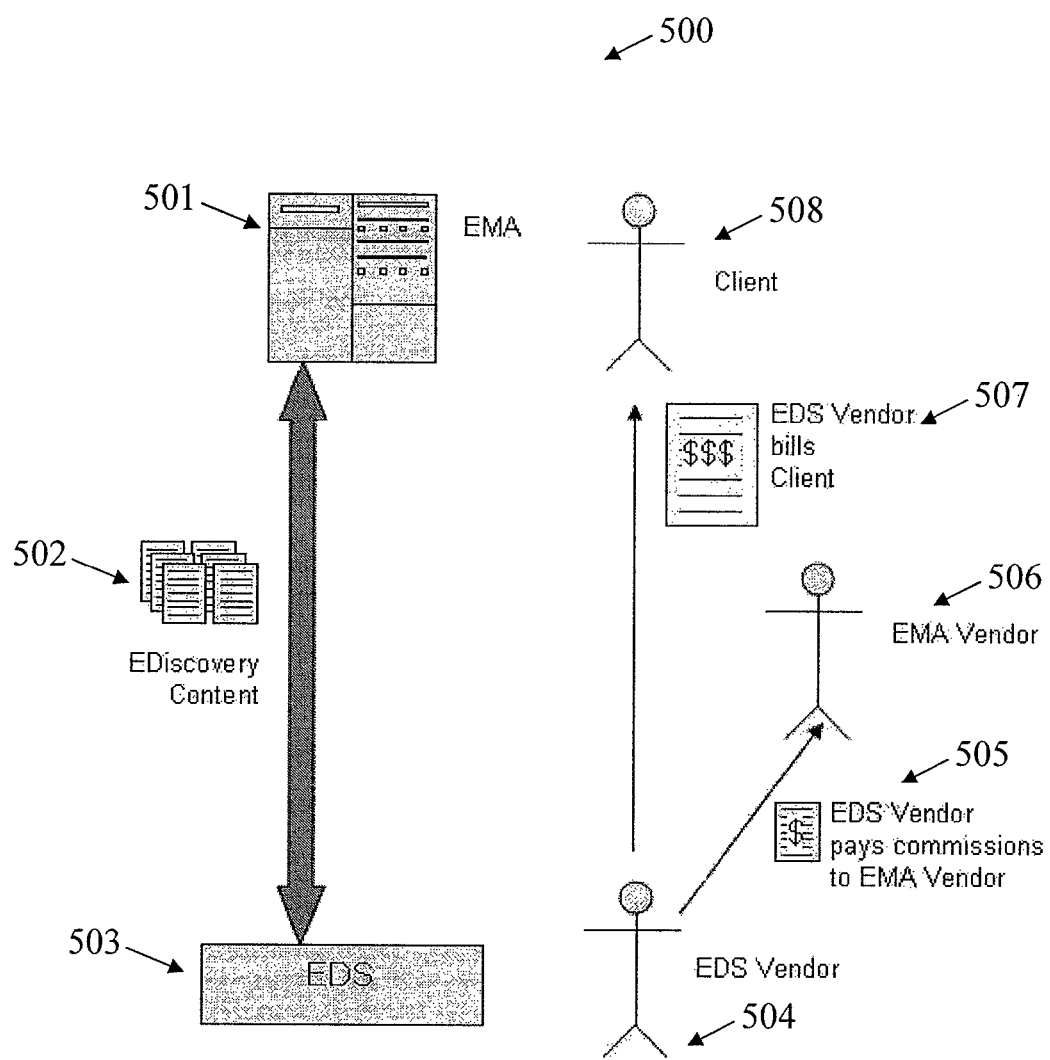
FIG. 5 shows a diagram of a method of providing storage services to a client by an EMA vendor and an EDS vendor wherein the client pays the EDS vendor, who shares proceeds with the EMA vendor.

As shown in FIGS. 4-5, the architectures of FIGS. 2 and 3 enable a variety of business models, each with the ultimate goal of providing the content owner with ample storage for e-discovery content, simply and inexpensively.

FIG. 4 shows a diagram of a business model 400, wherein three parties or entities are involved: the client or content owner 409, a MESL vendor 407 and an EDS vendor 405. The client 409, from an EMA 401, uses MESL 404 to store e-discovery content 402 on the EDS 403. The MESL is preferably controlled by the MESL vendor 407 and the EDS is preferably controlled by the EDS vendor 406. In such model, 400, the MESL vendor 407 may contract with the EDS vendor to lease data storage at a wholesale rate. Thus, as shown, billing for the storage committed to MESL vendor's 407 clients is billed 406 to the MESL vendor 407 by the EDS vendor. The client 409 contracts for storage with the MESL vendor 407 at a retail rate. In return, the MESL vendor allows the client 409 access to the EDS 403 through the MESL 404 controlled by the MESL vendor 407. Thus, the MESL vendor bills the client 408 at a retail rate 408, allowing the MESL vendor to provide its service at a profit, while the client still secures the advantages of using the EDS 403 to store e-discovery content 402.

FIG. 5 shows a diagram of a business model 500, also involving three parties: a client 508, an EMA vendor 506 and an EDS vendor 504. In such a model 500, the client typically contracts for content storage at a retail rate. In one embodiment, the EMA vendor 507 represents the EDS vendor 504. In another embodiment, the EMA vendor 507 is a retailer. The EMA 501 is controlled by the EMA vendor in such model 500. As in FIG. 2, a LESL (not shown) attached to the EMA 501 is particularly conducive to this model of doing business. As part of its agreement, the client 508 acquires access to the EMA 201. In such an arrangement, the EMA 501 may be hosted on an application server, for example. The client gains access to the ESL (not shown), for example, through a client application (not shown), such as a browser and transfers content 502 to the EDS 503 for propagation and storage. The various components in this model are preferably remotely hosted from each other, and therefore are communicatively coupled by means of a network such as the Internet. The EDS vendor 504, in such an arrangement, may bill the client directly 507, while paying the EMA vendor 506 a commission. In another embodiment, the EDS vendor may bill the EMA vendor 506 at a whole sale rate and the EMA vendor may bill the client 508 at a retail rate.

The foregoing business models are provided only for descriptive purposes and are not intended to be limiting. Other business models will occur to the ordinarily-skilled practitioner.

One of the capabilities enabled by the present system is the ability to create a mirror of content stored at a first EDS, at a second EDS. In computing, a mirror is a direct copy of a data set. Preferably, the mirror and the original data set are synchronized, at least periodically, so that they are substantially identical at all times. In one embodiment, a live mirror is automatically updated by an ESL as soon as the original data set is changed. The ability to mirror a data set provides a number of important advantages:
  if the original data set is inaccessible for any reason, the e-discovery content stored at the original data store remains accessible from the mirror; and
  e-discovery content can be stored regionally, making access and downloads easier and faster.

Figure 6:
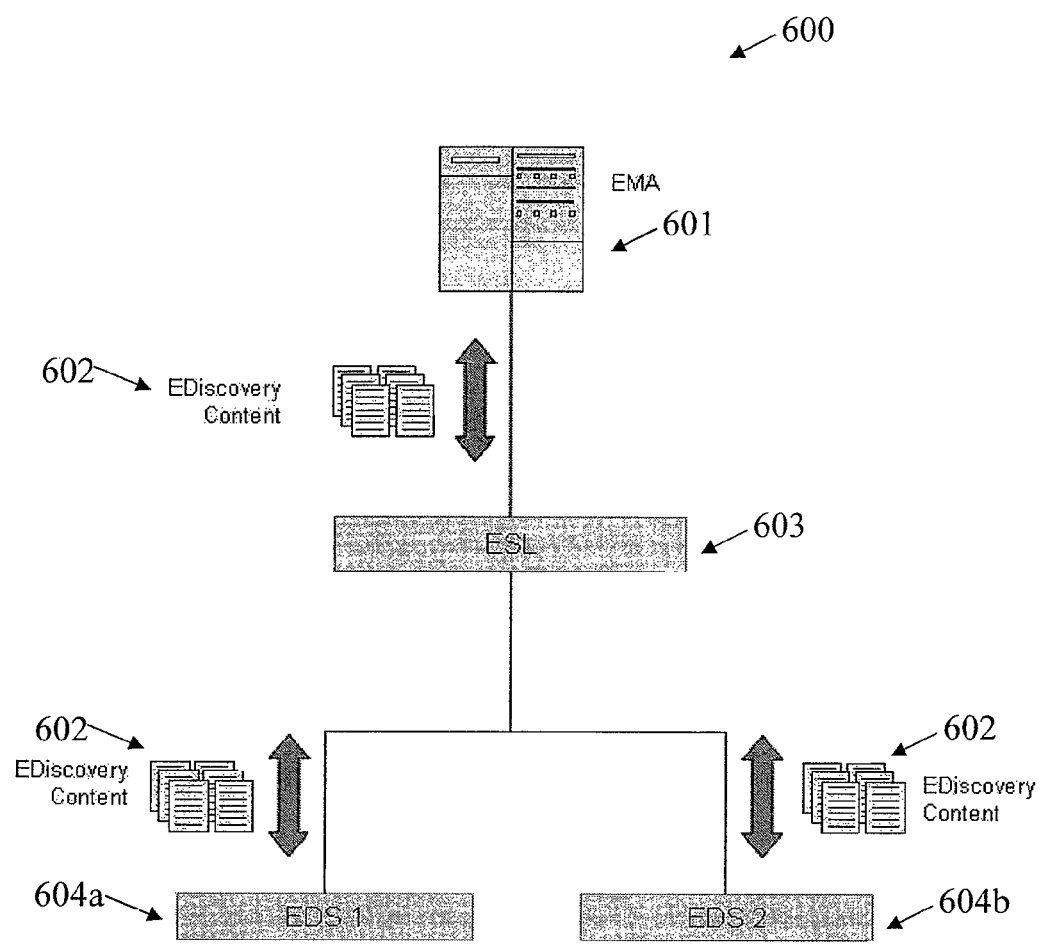
FIG. 6 shows a diagram of a method of mirroring content stored on first EDS on a second EDS.

Turning now to FIG. 6, a schematic diagram is shown of an architecture 600 that enables a content owner to mirror the content 602 stored at a first EDS 604a at a second EDS 604b. By means of an EMA 601, the content owner, for example, transfers e-discovery content 602, through an ESL 603 to a first EDS 604a. Either simultaneously, or at some future time, the ESL also propagates the same e-discovery content to a second EDS 604b. As above, the ESL also has the ability to synchronize the data sets so that when any changes are made to the original data set, the mirror is synchronized with the original data set. Thus, one EDS may be used as a primary store and the other as a backup when the primary store is unavailable or when a file is lost or corrupted, for example. Alternatively, both EDSs can be used as primary stores.

As mentioned above, one of the functional limitations of an EDS is that propagation of e-discovery content to the EDS can be rather time-consuming. Because of this, the content may be inaccessible to the content owner for a fairly long period of time. As mentioned above, the ESL includes elements that make it possible to provide functional features that the EDS lacks. In one embodiment, the ESL monitors the status of content as it is being propagated to the EDS and reports back to the content owner when the content is available.

Figure 7:
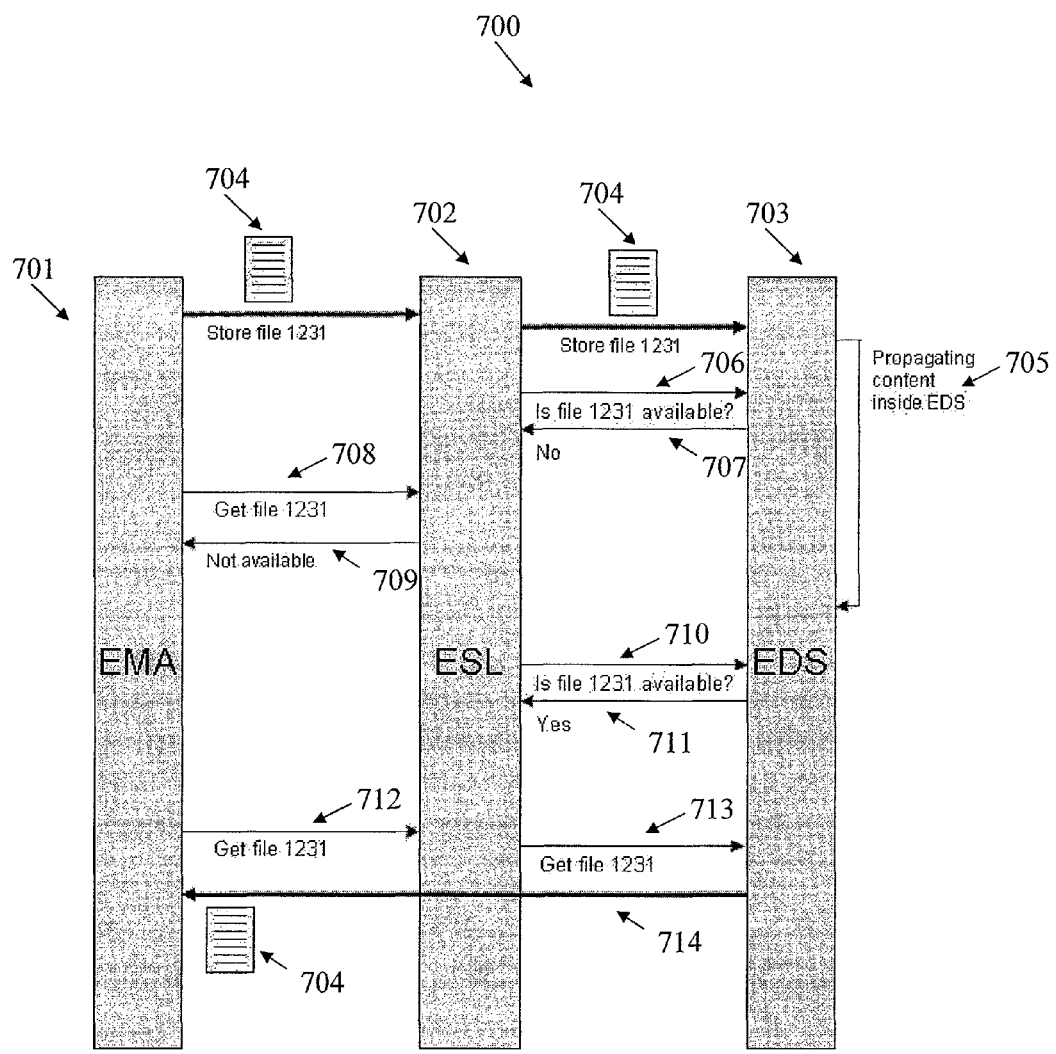
FIG. 7 provides a data flow diagram illustrating a process of storage readiness monitoring.

FIG. 7 shows a data flow diagram of a process 700 for storage readiness monitoring. To avoid confusion and errors on the EMA side, the ESL 702 can validate whether files imported into the EDS 703 are available for download. If not, it can respond with an error message or some other notification that the files are unavailable. At the EMA side 701, a file 704 is directed to the ESL 702 for storage on the EDS 703. During the time that the content is being propagated 705 to the EDS 703, the ESL 702 periodically queries 706 the EDS 703 to see if the file 704 is available. Until the content is available, the EDS 707 responds to the query that the file 704 is unavailable. Because the ESL 702 always knows the status of the content, in the event that the content owner requests 708 the file 704, the ESL 702 promptly reports back 709 that the file is unavailable. Thus, the content owner is advised of the availability of the content. As shown, the ESL continually queries 710 the EDS until it is notified that the content is available. Subsequently, when the content owner requests 712 the file, the ESL 702, promptly requests the file 713 from the data store and returns it 714 to the content owner.

Figure 8:
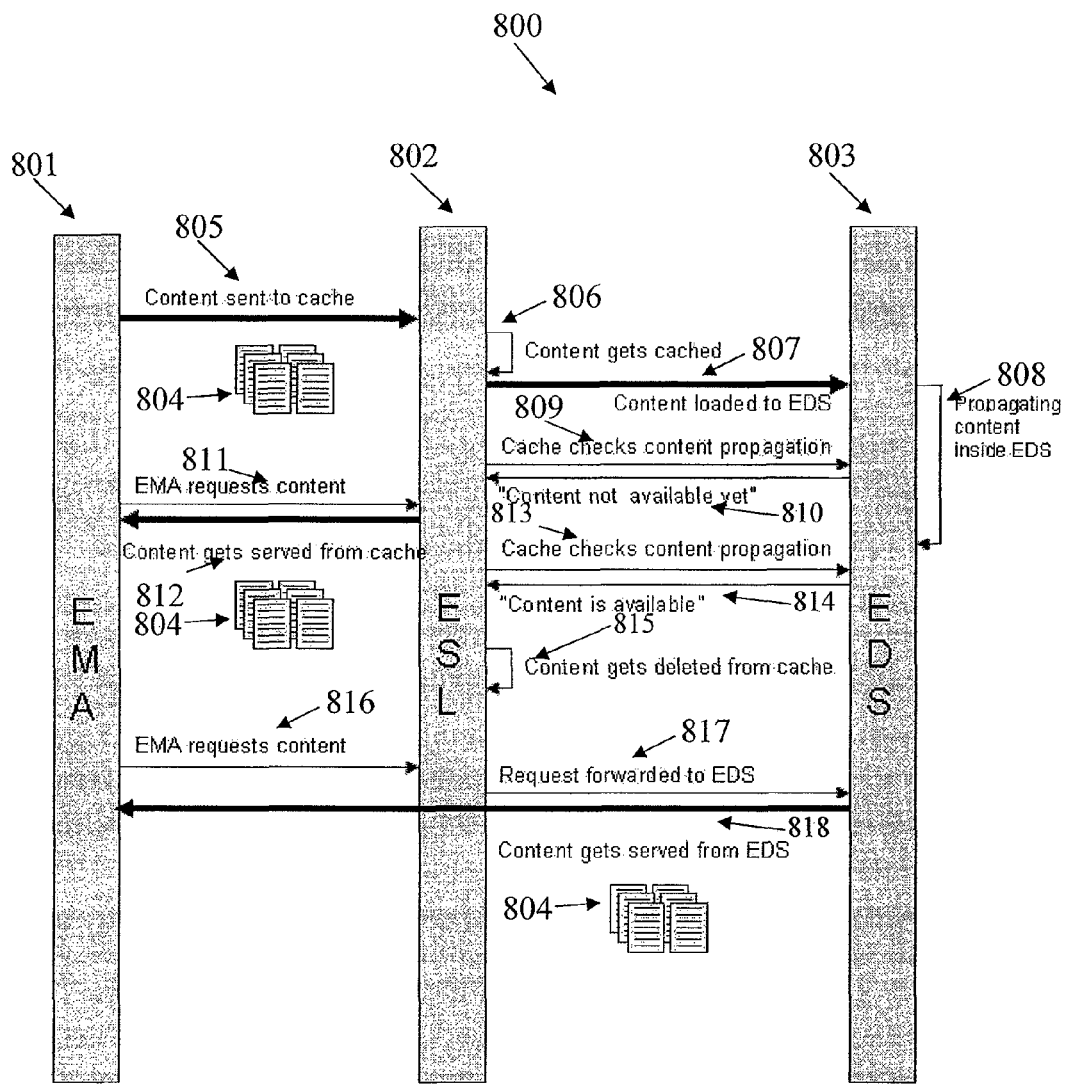
FIG. 8 provides a data flow diagram of a process of caching content on an ESL to eliminate file propagation latency.

In one embodiment, as shown in FIG. 8, the ESL caches the content so that the content is fully available during the latency period while it is being propagated to the EDS. FIG. 8 provides a data flow diagram of a process 800 for caching content 804 at the ESL 802 while it is being propagated to the EDS 803. The content 804 is sent 805 to the ESL 802 from the EMA side 801. The content 804 is then loaded 807 to the EDS 803. Additionally, the content is cached 806 at the ESL. During the period when the content is being propagated 808 in the EDS 803, the ESL 802 monitors the storage readiness of the content 809. As long as the EDS returns an indication that the content is not yet available 810, the ESL maintains the cache. If, during the time that the content 804 is unavailable due to the propagation latency, the content is requested 811 from the EMA side 801, the content is served 812 from the cache. Thus, even though the content propagated to the EDS 803 may not yet be available, the request for the content can still be filled by serving from the cache.

At some time interval after the content is propagated in the EDS, when the ESL checks the content propagation 813, the EDS may indicate 814 that the content is available. At that time, the content 805 may be deleted from the cache 815. Thereafter, when a request for content is directed 816 to the ESL 802 from the EMA side 801, the request may be forwarded 817 to the EDS and is served from the EDS 803, and passed to the EMA side 801.

While an EDS typically provides some sort of data security protocol, the content owner may find the protocol insufficient to satisfy data security requirements for e-discovery. For example, the underlying EDS may provide insufficient capability regarding secure file transmission between the EMA side and the EDS: the EDS may allow uploading and downloading files only through an insecure HTTP protocol. The interposition of an ESL between the EMA side and the EDS provides a front end that can expose a more secure transmission protocol to the EMA, for example, HTTPS. Thus, the ESL allows a content owner or a vendor to supplement, or even supplant, the security protocols in place.

In one embodiment, a remote ESL may overwrite an EDS's authentication and authorization mechanisms. For example, EDSs tend to provide authentication and authorization mechanisms that are not designed for multi-tenant support, such as that provided by a MESL vendor. In one embodiment, an ESL provides its own authentication and authorization protocol that assigns unique authentication credentials to each client of the vendor and provides access for different clients to different locations in the EDS storage, further described herein below. More will be said about partitioning of EDS storage for multiple clients herein below.

Additionally, the EDS may lack the capability to index the content or to perform full-text searching.

Figure 9:
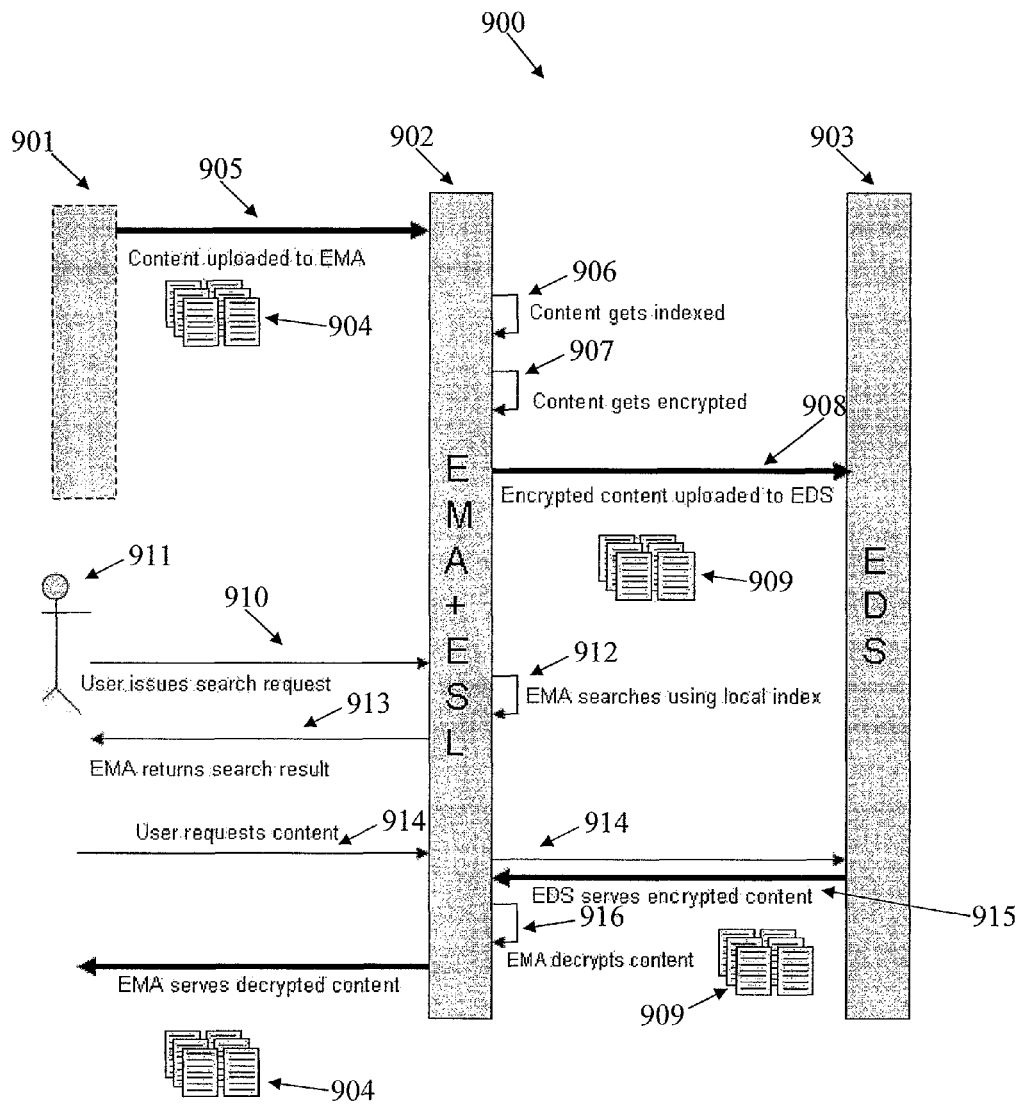
FIG. 9 shows a data flow diagram of a process that allows indexing and search on the EMA side of an ESL and encrypting content for storage in an EDS.

FIG. 9 shows a data flow diagram of a process 900 that allows indexing and full-text searching on the EMA side of an ESL and encrypting/decryption of content independently of the EDS. Content 904 may be uploaded 905 to an EMA/ESL layer 902. As previously described, the ESL may be physically attached to the EMA, or the EMA and the ESL may constitute a logical layer, even though they are actually remotely hosted from each other and communicatively coupled by means of a network connection. Typically, the content is uploaded via a client application 901 hosted on a computing device under the control of the content owner. At the EMA side 902, the content may be indexed 906 before it is uploaded to the EDS 908. In one embodiment, to prevent files from being viewed in the EDS or on an ESL hosted by a third party, files may be encrypted 907 at the EMA side before sending them to the EDS. Various approaches to indexing the content will be known to the ordinarily-skilled practitioner. Preferably, the content having been indexed, the index is maintained at the EMA/ESL layer 902. Additionally, the content to be uploaded may be encrypted 907 by means of any suitable approach known to the ordinarily-skilled practitioner. Following the indexing and/or encryption operations, the encrypted content 909 is uploaded 908 to the EDS 903 for propagation within the EDS 903.

Subsequently, because the index and a text search facility are hosted at the EMA/ESL layer 902, a user 911 at the client side 901 is able to readily retrieve content from the EDS in response to a search request. The user 911 issues the search request 910, which is directed to the EMA/ESL layer 902. By searching the index 912 maintained at the EMA/ESL side 902, any content satisfying the user's 911 search parameters is readily located within the encrypted content 909. After the index is searched 912, a search result 913 may be returned to the user 911. After the user reviews the result, the user can request 914 specific items identified in the search. The request is relayed to the EDS 903 by the EMA/ESL layer 902. In response to the request, the EDS 903 serves up the encrypted content 909 requested by the user. The content is decrypted 916 at the EMA/ESL layer 902. The EMA/ESL layer 902, in turn, serves the content to the user 911.

The ordinarily-skilled practitioner will readily recognize that the processes of indexing and encryption/decryption are not necessarily paired. That is, content could be indexed at the EMA/ESL side without then being encrypted before being uploaded to the EDS. Additionally, content could be encrypted and uploaded to the EDS without first having been indexed.

In addition to the foregoing, there are other ways in which files may be modified at the EMA/ESL prior to uploading to the EDS: compression, for example. Reducing the volume of data to be uploaded by compressing it can be beneficial because it can reduce the amount of storage required, allowing more content to be stored per unit of storage leased or purchased, possibly achieving a significant reduction in the total cost of an e-discovery program, depending on vendor pricing models. An additional benefit to compressing the data is that network latency may be reduced because smaller volumes of data are being transported.

Figure 10:
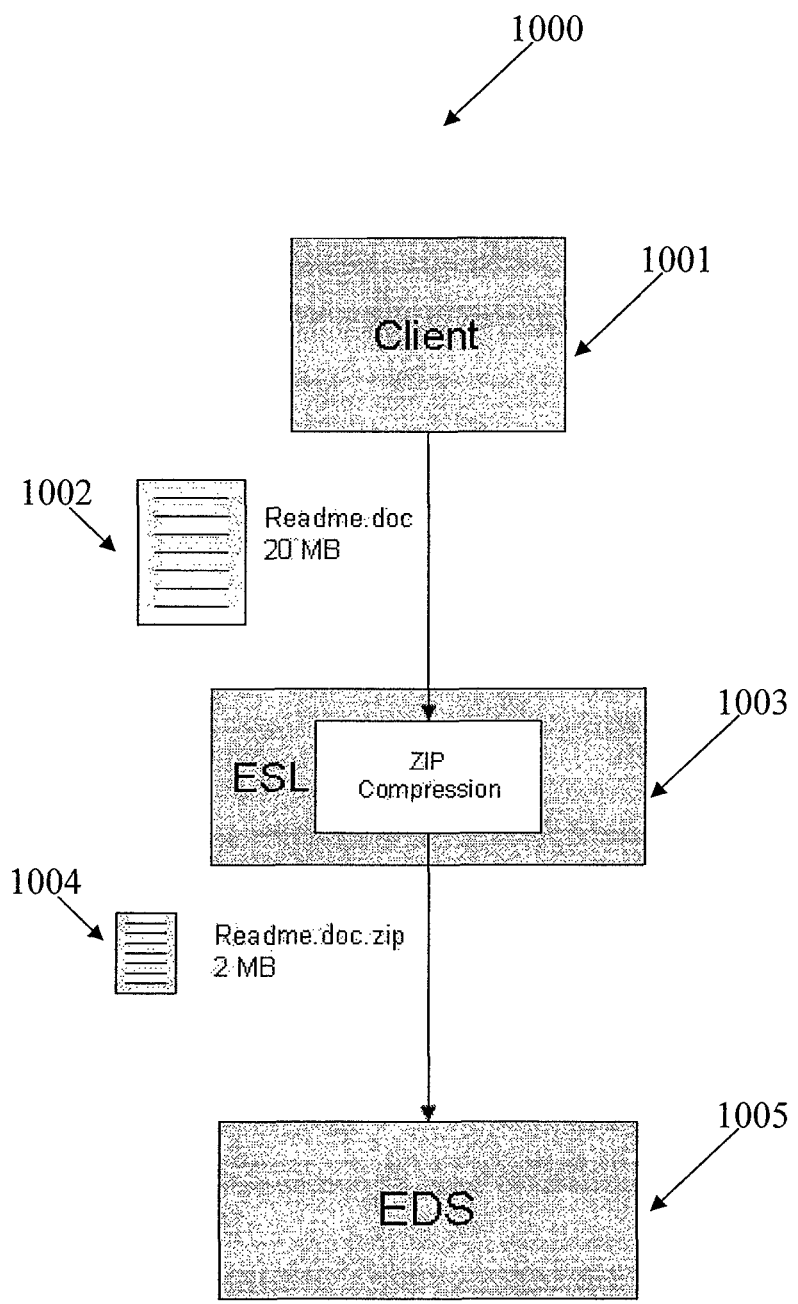
FIG. 10 provides a diagram of a process for compression of files on an ESL prior to upload at an ESL.

FIG. 10 provides a flow diagram of a process 1000 for compressing content at the ESL before uploading to the EDS. A document 1002 is uploaded to an ESL 1003. As shown in the diagram, the document 1002 may originate at a client 1001. In one embodiment, the ESL layer 1003 may include an attached EMA (not shown). In other embodiments, the layer immediately preceding the ESL 1003, from which the document 1002 is directed to the ESL 1003, is an EMA (not shown). However, at the ESL 1003, prior to upload to the EDS 1005, the file may be compressed. As shown in the diagram, in one embodiment, the compression format employed is preferably the ZIP format. The ZIP format typically allows creation of highly compressed data files and subsequent creation of an archival file from the compressed data file. However, other compression formats, such as gz or bzip2, may also be used. The result of compression is, for example, a .zip file 1004 of the original file, which is then directed to the EDS 1005 for archival.

The ESL can additionally perform content transformations, such as extraction of files from archives and extracting email messages from email archives. The content owner may, for example, wish to archive a .pst file, which the ordinarily skilled practitioner will recognize as a "personal folders file" associated with certain software applications produced by MICROSOFT CORPORATION (Redmond, Wash.), such as OUTLOOK. In a typical .pst file, messages, calendar items, and other items are delivered to and stored locally in a personal folders (.pst) file that is located on a user's computer. However, it may not be desired to archive the separate item types as a single archival file. The content owner, may for example, want to store them as separate email, attachment, and calendar item archives. In one embodiment, the ESL performs the work of extracting the separate items from an archive and storing them as multiple files, and then reports to the owner that the archive has been extracted into multiple files, also reporting the metadata for each of the item types.

Figure 11:
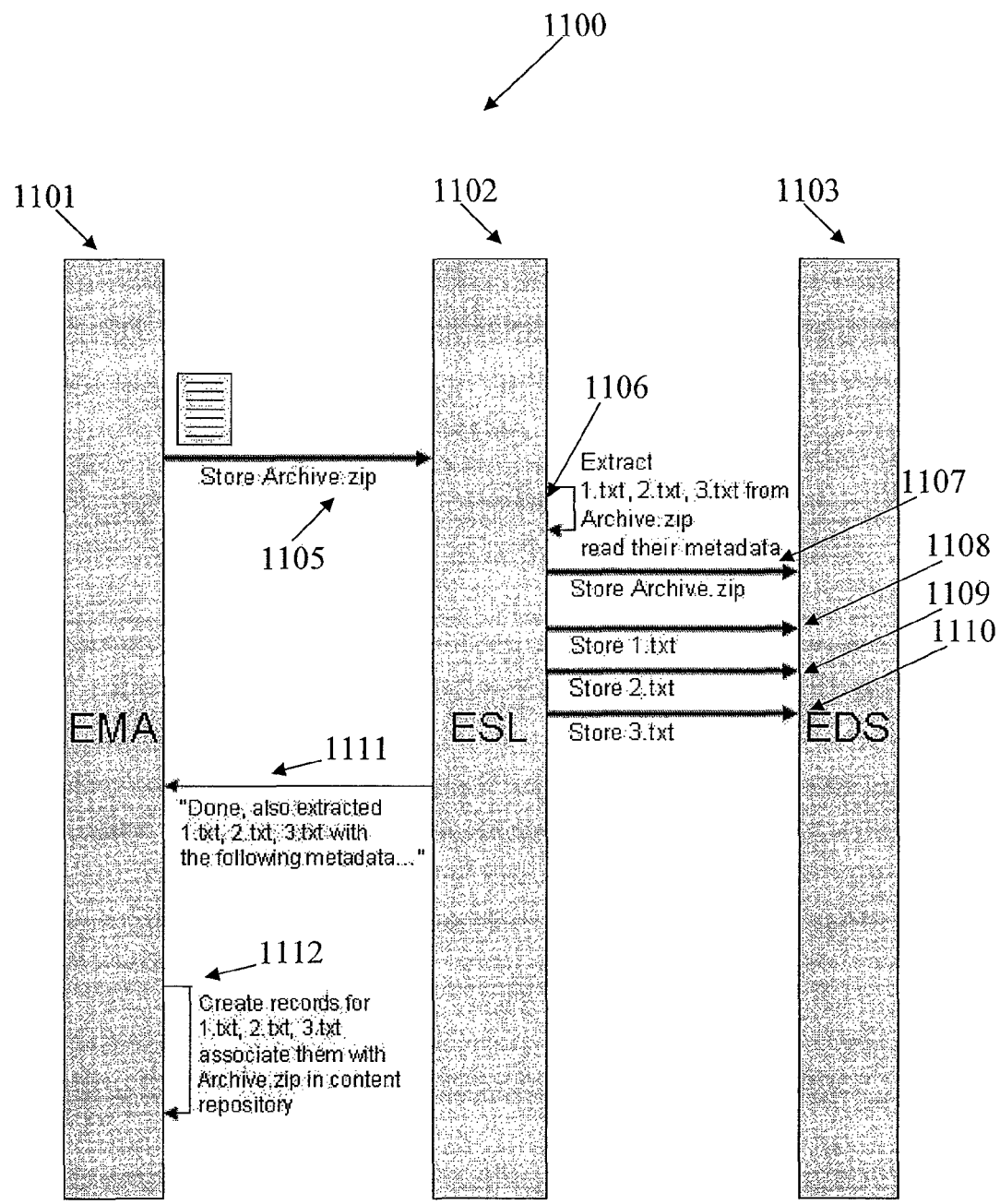
FIG. 11 shows a data flow diagram of a process for content transformation that allows a client to extract files from an archive.

FIG. 11 shows a data flow diagram of a process for content transformation that allows a client to extract files from an archive. From the EMA side 1101, an archive 1105 is uploaded to the ESL 1102. At the ESL 1102, documents may be extracted from the archive 1106. As shown in the diagram, files "1.txt," "2.txt" and "3.txt" are extracted from Archive.zip. While FIG. 11 illustrates an embodiment based on zip files, the embodiment shown is illustrative. In actual fact, other embodiments work with additional archival formats, .tar, for example. In an exemplary embodiment, the archive may have been one or more .pst files as described above. To order the separate items in storage in a manner that makes them more readily accessible, the content owner may elect to have messages, attachments and calendar items extracted from the archive and saved separately, in addition to being stored in the archive in their original context. In one embodiment, the ESL may incorporate an extraction utility that is capable of extracting single items or item types from an archive.

As items are extracted, the ESL also reads their metadata, so that they can be readily identified at a later time. After extracting the files, the ESL uploads the archive (Archive.zip) 1107 and the three files 1108, 1109 and 1110. While the extracted files are shown being uploaded to the EDS 1103 as text files, they could also be compressed and converted into an archive on the ESL 1102 prior to being uploaded. The ESL then confirms 1111 completion of the upload and extraction of the three files and reports the metadata for the three files to the EMA 1101. At the EMA side, records may be created for the extracted files 1112 and associated to the archive.

While the foregoing process has been described in relation to email and attachments, it is applicable to other types of archived content wherein it is important to archive items of content within context, but it is also desired to archive records according to, for example, type or series: accounts receivable records, for example.

In one embodiment, the ESL also includes means for ensuring data integrity. By means of a process such as that described below, the ESL verifies that a file returned from the EDS has not been altered or corrupted. Additionally, the EMA can use a similar process to verify that files have not been altered in a remote ESL:

the file's hash value or digital signature is calculated prior to sending the file to EDS or Remote ESL;

hash values or other signatures are stored in the EMA or the remote ESL;

when a requested file arrives from EDS or remote ESL, hash value or signature is re-calculated and compared with the original value;

if hash values or digital signatures match, file integrity has been maintained. Otherwise the file has either been altered or corrupted.

The foregoing description of a file integrity algorithm is exemplary only. Other approaches to determining file integrity will occur to the ordinarily-skilled practitioner.

As described above, in one embodiment, a MESL may be hosted by an MESL vendor who then provides low-coast e-discovery storage for clients on a fee basis. In order to provide such a service to multiple tenants, one embodiment provides a series of capabilities that remedies the challenges involved in providing multi-tenant support.

Figure 12:
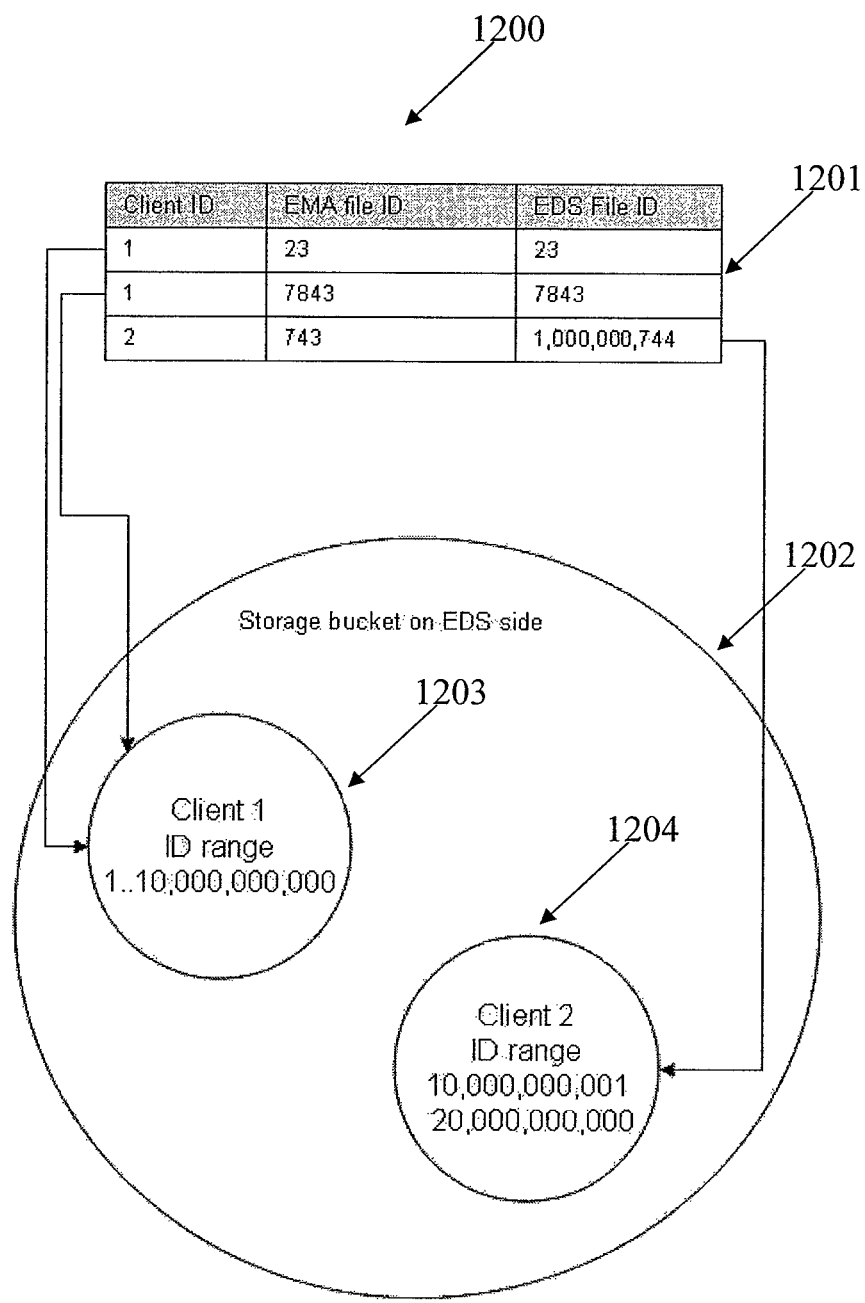
FIG. 12 provides a diagram illustrating storage partitioning of an underlying EDS store for multi-tenant support, wherein a MESL allocates ID ranges to multiple clients and maps EMA file IDs to EDS file IDs with the mapping being stored in a MESL database.

In one embodiment, the ESL may provide storage partitioning. The underlying EDS partition commonly provided by the EDS vendor may be insufficient for a vendor hosting either an MESL or an EMA. For example, the maximum number of folders allowed by an EDS vendor may be less than the number of content folders needed to support multiple clients in a multi-tenant configuration. In such condition, the ESL provides mapping between partitions exposed to the EMA and partitions of the underlying EDS. Referring now to FIG. 12, shown is a diagram that illustrates a process 1200 for providing multi-tenant support. FIG. 12 assumes, for the sake of illustration, a vendor providing multi-tenant support by means of an MESL. As shown in FIG. 12, the vendor has client #1 and client #2, identified by client IDs 1 and 2, respectively in table 1201. The ESL vendor has a single storage bucket 1202 assigned to it by the EDS vendor. Thus, in order to service multiple tenants with the single bucket, the ESL vendor needs to be able to adapt a single bucket so that it can be portioned out to different tenants. The MESL provides the capability of mapping file names, as shown in table 1201 to a portion of the bucket file IDs—actually, to a portion of the bucket, which has been assigned to the client, for which the storage layer maintains the mapping. As shown in FIG. 12, client #1 is assigned bucket IDs from 1 to 10 billion 1203. Client #2 is assigned bucket IDs from 10,000,000,001 to 20 billion, so that if the EMA file ID "23" comes from client #1, its EDS file ID will become 23. If the same EMA file ID comes from client #2, it becomes EDS file ID 10,000,000,023. Thus, by allocating a different range of EDS file IDs to each of multiple clients, an underlying EDS data store can be partitioned to serve multiple clients. The mapping is stored in a MESL database.

Additionally, an embodiment of the ESL includes means for logically overcoming EDS limitations such as limitations on minimum and maximum file sizes. These limitations are overcome by the ESL, for example, by pre-pending extra bytes to an under-sized file and splitting over-sized files into multiple chunks.

The foregoing address-assigning scheme also creates the possibility that content can be distributed across more than one EDS. Thus, an ESL can store a first portion of a content collection with one EDS and a second portion with another EDS. Thus, a content collection can be subdivided into any number of units, with storage of those units being distributed across several EDSs. The addressing scheme allows the ESL vendor to know exactly which file is located on which EDS and to move files readily from one EDS to another. For example, if the situation occurred that one EDS vendor turned out not to be as good as another, the ESL can simply issue a command to transfer content to another vendor. Accordingly, the ESL vendor or the content owner is free to deal with more than one vendor as a result of the ability to distribute content across multiple EDSs.

Figure 13:
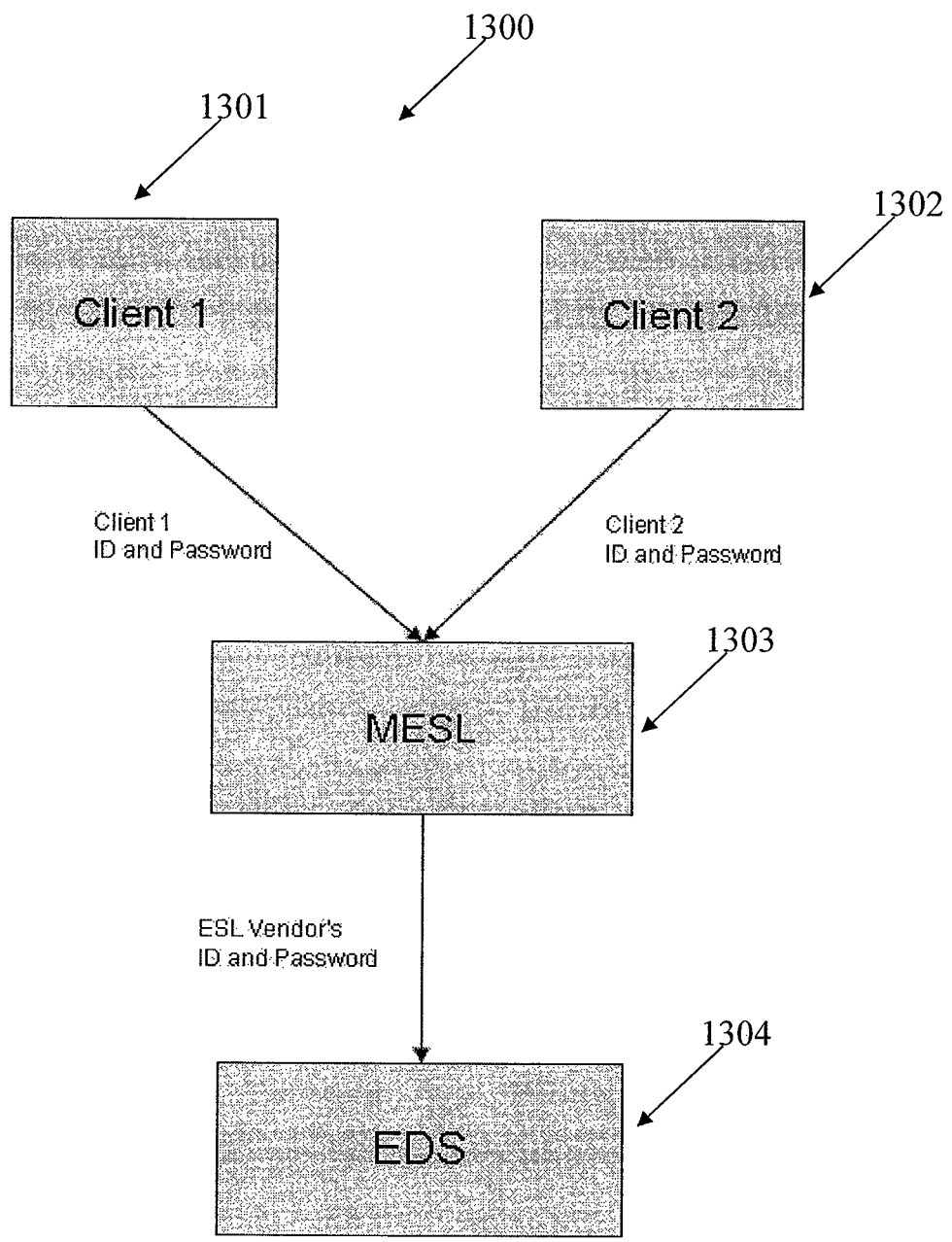
FIG. 13 provides a diagram of a multi-tenant authentication mechanism from a MESL to an EMA.

As above, an embodiment of the ESL exposes a multi-tenant authentication mechanism from an MESL to an EMA. Referring now to FIG. 13, shown is a diagram of a multi-tenant authentication process 1300. As shown, clients #1 1301 and #2 1302 are each assigned authentication credentials by the MESL vendor, with which the clients authenticate to the MESL 1303. The MESL vendor, in turn authenticates on the EDS 1304 by means of authentication credentials issued to the MESL vendor 1303 by the EDS vendor 1304. Thus, the MESL vendor functions as intermediary for the each of clients #1 and #2, with the MESL vendor's authentication process 1300 compensating for the EDS vendor's authentication process that does not allow for multiple users to access a single bucket.

Figure 14:
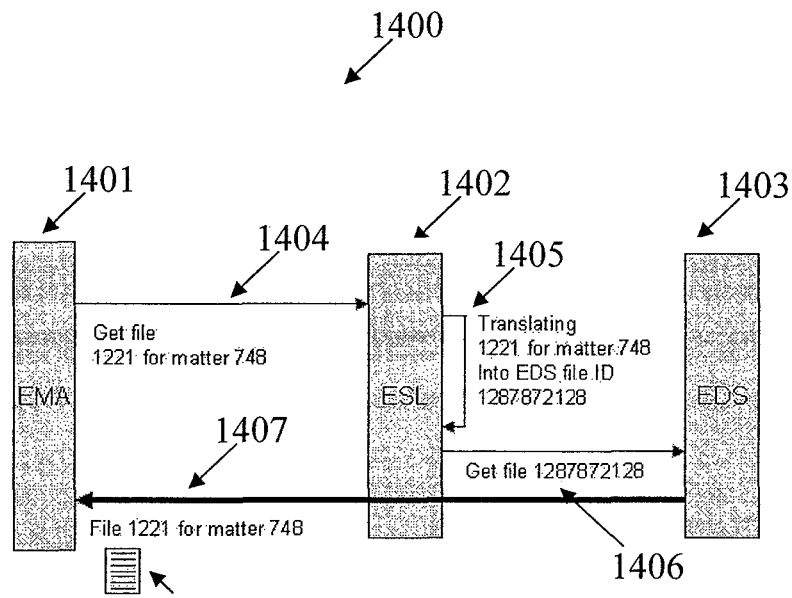
FIG. 14 provides a data flow diagram of a process for retrieving "hot" content from an EDS.

An embodiment provides "transparent archival" capability, wherein both "hot" content and archived content can be retrieved through the ESL the same manner. Referring now to FIG. 14, shown is a process 1400 for retrieving "hot" (hereinafter "current") content through the ESL. As shown, the EMA side 1401 directs a request 1404 for a particular item to the ESL 1402. As shown, the item is identified by item number and matter number. The ESL 1402 consults its mapping database (described herein above) to determine the EDS item number for the item sought and translates the number 1405 in the original request to the a request identifying the item by the EDS item number, which is directed 1406 to the EDS 1403. The EDS, in turn, serves up the items associated to the EDS item number requested 1408, which is then directed 1407 to the EMA 1401. The practitioner of ordinary skill will recognize that the content is preferably stored in its original format and not in an archival format.

AP. I would suggest replacing the phrase "item number" with "item identifier" here and in other places.

Figure 15:
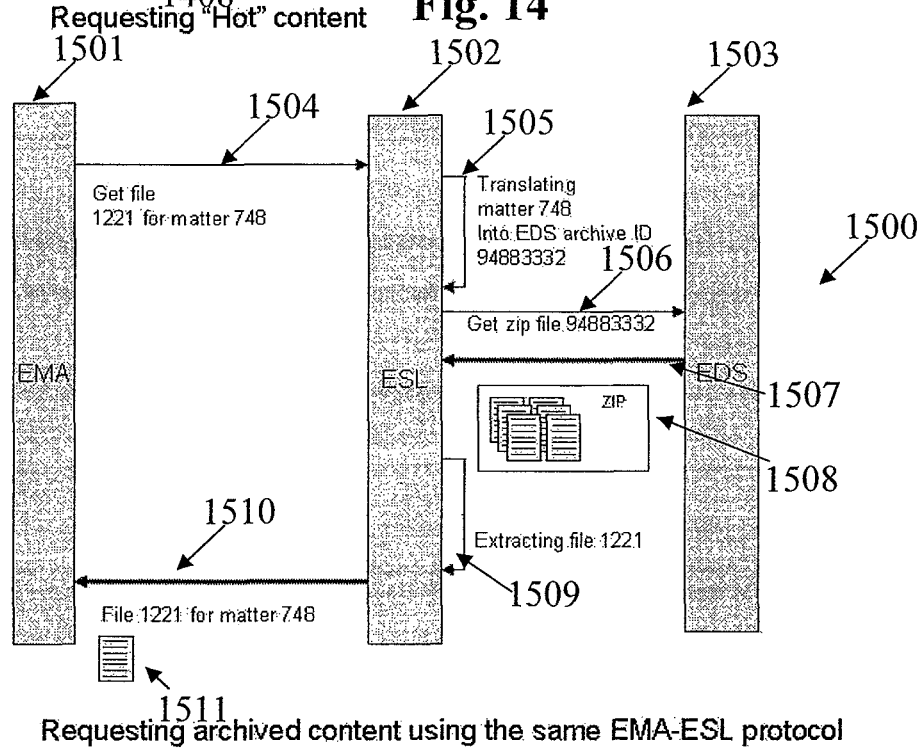
FIG. 15 provides a data flow diagram of a transparent process for retrieving archived content.

FIG. 15 shows a diagram of a process 1500 for retrieving archived content from storage. The ordinarily-skilled practitioner will note that the present process involves retrieval of content that has changed form by being converted to an archival format. The EMA side 1501 directs a request 1504 for a particular item to the ESL 1502. As shown, the item is identified by item number and matter number. The ESL 1502 consults its mapping database (described herein above) to determine the EDS item number for the archival file containing the requested item. The ESL translates the number 1505 in the original request to a request identifying the archive by the EDS item number, which is directed 1506 to the EDS 1503. The EDS, in turn, serves up 1507 the archival file 1508 associated to the EDS item number requested. The ESL 1502 extracts 1509 the file 1511 originally requested, which is then directed 1510 to the EMA 1501.

In one embodiment, both current and archived content are stored in the original format and not converted to an archival format. In such embodiment, content is simply designated either as "hot" or as archived by the content owner; although the ESL vendor has not changed the way the content is stored. Even though current or "hot" content is stored in the same way as archived content, the vendor may adopt a pricing model wherein the charge for storing current content is considerably greater than the charge for storing archived content. The higher storage charge for current content is justified by the greater retrieval cost incurred by the ESL vendor, because the content owner is likely to need access to current content much more frequently than to archived content.

In another embodiment, current content and archived content are stored differently, as shown in FIGS. 14 and 15. Current and archived content may be stored in different EDSs, such that archived content is stored in an EDS wherein the EDS vendor charges less for storage and more for transmission.

Archived files that belong to the same legal request can be merged into one archive and stored together, resulting in a smaller storage price but possibly a higher transmission price and greater latency, which is typical for an archive.

Archived content may be compressed before storage whereas current content is not, resulting in lower storage and transmission costs but higher processing overhead on ESL side.

An embodiment offers the capabilities of documenting chain of custody, logging and providing an audit trail. A MESL may collect and provide chain of custody information by recording when documents are stored and retrieved, by whom and for what reason. Additionally, the MESL may perform system event logging and also maintain a collection audit trail by journaling all business events happening during the storage process, thus ensuring defensibility and transparency of the e-discovery process.

An embodiment provides per-tenant, per-matter, per-legal request traffic, storage, billing, reporting, and maintenance information to EMA or ESL vendors for billing purposes when the EMA vendor charges its clients based on number of legal matters and legal requests, traffic or storage. Per-tenant information is provided for an operation by an MESL Vendor that handles multiple clients.

Figure 16:
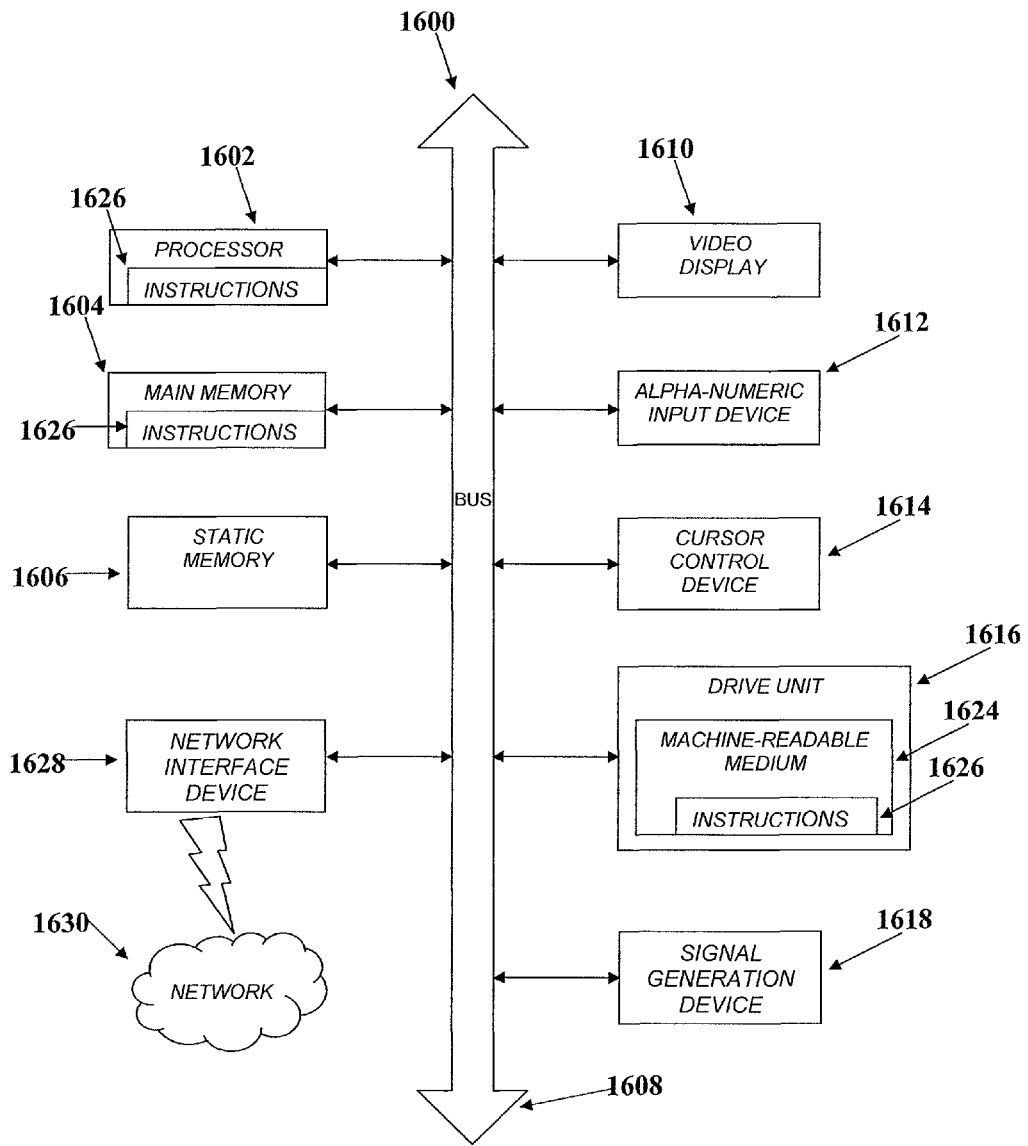
FIG. 16 shows a diagrammatic representation of a machine in the exemplary form of a computer system within which a set of instructions for implementing the various embodiments of the invention may be executed.

FIG. 16 shows a diagrammatic representation of a machine in the exemplary form of a computer system 1600 within which a set of instructions for causing the machine to perform any one of the foregoing methodologies may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine. The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. An apparatus for management of e-discovery content comprising:
    an external storage layer (ESL) interposed between an e-discovery management module (EMA) and an external data store (EDS) that is configured to store immutable, unstructured content collected during e-discovery, the ESL including at least one processing element programmed for:
    propagating the content to the EDS; and
    implementing at least one functionality not implemented by the EDS for managing the content stored within the EDS, the at least one functionality including:
    partitioning an underlying data store in the EDS for multi-tenant support, including:
        assigning separate ranges of addresses in said underlying data store to each of a plurality of tenants,
        mapping an item number stored by a tenant to an address within the ranges of addresses assigned to said tenant, and
        storing said mapping at said EDS;
    wherein the ESL constitutes an intermediary enabling the EMA access to the EDS.

2. The apparatus of claim 1, wherein said ESL comprises either of:
   a local ESL (LESL); and
   a multi-tenant ESL (MESL);
   wherein said LESL is either physically or functionally integrated with said EMA; and
   wherein said MESL is communicatively coupled with said EMA and said EDS by means of a network connection; and
   wherein said EDS comprises at least one cloud data store under the control of an EDS vendor.

3. The apparatus of claim 1, wherein the at least one functionality further comprises at least one of:
   mirroring content stored on a first EDS on at least one other EDS;
   distributing a body of content across multiple EDSs;
   indexing content prior to propagation to said EDS;
   encryption and decryption of content propagated to said EDS;
   compressing content prior to upload to an EDS;
   extracting at least one item from a compressed body of content;
   providing secure transmission of content between said ESL and said EDS; and
   providing multi-tenant authentication.

4. The apparatus of claim 3, wherein extracting at least one item from a compressed body of content comprises at least one of extracting at least one item from a compressed body of content according to instructions from a content owner;
   copying metadata for said at least one extracted item;
   uploading said compressed body of content and said at least one extracted item to said EDS;
   reporting completion of said upload to said content owner and forwarding said copied metadata so that it can be associated to said stored at least one item.

5. The apparatus of claim 1, wherein the at least one functionality further comprises designating content having identical format as "current" or "archival," wherein said current content and said archival content are stored in the same EDS.

6. The apparatus of claim 1, wherein content in archival format is stored to a first EDS and wherein current content is stored at a second EDS.

7. The apparatus of claim 1, wherein the at least one functionality further comprises verifying integrity of content retrieved from said EDS by:
   generating a first signature of an item prior to storage of the item;
   generating a second signature of the item after being retrieved; and
   comparing the first and second signatures, wherein if the first and second signatures are the same, integrating of the item has been maintained and if the signatures do not match, the item has been corrupted or modified.

8. A system for management of e-discovery content comprising:
   at least one external data store (EDS) configured to store content collected during e-discovery;
   at least one e-discovery management module (EMA); and
   at least one external storage layer (ESL) interposed between said at least one (EMA) and said at least one external data store (EDS) and communicatively coupled with said EDS and said EMA, said at least one ESL including at least one processing element programmed for propagating said content to said at least one EDS and managing e-discovery content stored within said at least one EDS, wherein said at least one ESL constitutes at least one intermediary enabling access to said at least one EDS from said at least one EMA, the at least one ESL further implementing at least one functionality not implemented by the at least one EDS for managing the content stored within the at least one EDS, the at least one functionality including:
   partitioning an underlying data store in the at least one EDS for multi-tenant support, including:
      assigning separate ranges of addresses in said underlying data store to each of a plurality of tenants,
      mapping an item number stored by a tenant to an address within the ranges of addresses assigned to said tenant, and
      storing said mapping at said EDS.

9. A computer readable storage medium encoded with instructions, which when loaded into a digital computational device establishes an apparatus for management of e-discovery content comprising, the apparatus comprising:
   an external storage layer (ESL) interposed between an e-discovery management module (EMA) and an external data store (EDS) that is configured to store immutable, unstructured content collected during e-discovery, said ESL including at least one module for:
   propagating said e-discovery content to said EDS;
   monitoring storage readiness of content being propagated to said EDS;
   managing e-discovery content stored within said EDS; and
   implementing at least one functionality not implemented by the EDS for managing the content stored within the EDS, the at least one functionality including:
   allowing the EMA access to the content as the content propagates to the EDS by caching the content at the at least one ESL as the content propagates to the EDS to eliminate propagation latency, and
   partitioning an underlying data store in the EDS for multi-tenant support;
   wherein said ESL constitutes an intermediary enabling access to said EDS from the EMA.

10. The computer readable storage medium of claim 9, wherein said ESL comprises either of:
   a local ESL (LESL); and
   a multi-tenant ESL (MESL);
   wherein said LESL is either physically or functionally integrated with said EMA; and
   wherein said MESL is communicatively coupled with said EMA and said EDS by means of a network connection; and
   wherein EDS said comprises at least one cloud data store under the control of an EDS vendor.

11. The computer readable storage medium of claim 9, wherein said at least one module comprises at least one of:
   at least one module for mirroring content stored on a first EDS on at least one other EDS;
   at least one module for distributing a body of content across multiple EDSs;
   at least one module for indexing content prior to propagation to said EDS;
   at least one module for encryption and decryption of content propagated to said EDS;
   at least one module for compressing content prior to upload to an EDS;
   at least one module for extracting at least one item from a compressed body of content;
   at least one module for providing secure transmission of content between said ESL and said EDS; and
   at least one module for providing multi-tenant authentication.

12. The computer readable storage medium of claim 11, wherein said at least one module for extracting at least one item from a compressed body of content comprises means for:
    extracting at least one item from a compressed body of content according to instructions from a content owner;
    copying metadata for said at least one extracted item;
    uploading said compressed body of content and said at least one extracted item to said EDS;
    reporting completion of said upload to said content owner and forwarding said copied metadata so that it can be associated to said stored at least one item.

13. The computer readable storage medium of claim 9, further comprising a module for designating content having identical format as "current" or "archival," wherein said current content and said archival content are stored in the same EDS.

14. The computer readable storage medium of claim 9, wherein content in archival format is stored to a first EDS and wherein current content is stored at a second EDS.

15. The computer readable storage medium of claim 9, said apparatus further comprising at least one module for verifying integrity of content retrieved from said EDS by:
    generating a first signature of an item prior to storage of the item;
    generating a second signature of the item after being retrieved; and
    comparing the first and second signatures, wherein if the first and second signatures are the same, integrating of the item has been maintained and if the signatures do not match, the item has been corrupted or modified.

16. A method for management of e-discovery content comprising:
    interposing an external storage layer (ESL) between an e-discovery management module (EMA) and an external data store (EDS) that is configured to store immutable, unstructured content collected during e-discovery;
    propagating said content to said EDS;
    monitoring storage readiness of content being propagated to said EDS;
    managing content stored within said EDS, wherein said ESL constitutes an intermediary enabling access to said EDS from the EMA; and
    implementing at least one functionality not implemented by the EDS for managing the content stored within the EDS, the at least one functionality including:
    partitioning an underlying data store in the EDS for multi-tenant support, including:
        assigning separate ranges of addresses in said underlying data store to each of a plurality of tenants,
        mapping an item number stored by a tenant to an address within the ranges of addresses assigned to said tenant, and
        storing said mapping at said EDS.

17. The method of claim 16, wherein said ESL comprises either of:
    a local ESL (LESL); and
    a multi-tenant ESL (MESL);
    wherein said LESL is either physically or functionally integrated with said EMA; and
    wherein said MESL is communicatively coupled with said EMA and said EDS by means of a network connection; and
    wherein said EDS comprises at least one cloud data store under the control of an EDS vendor.

18. The method of claim 16, wherein the at least one functionality not implemented by the EDS further comprises at least one of:
    mirroring content stored on a first EDS on at least one other EDS;
    distributing a body of content across multiple EDSs;
    indexing content prior to propagation to said EDS;
    encrypting and decrypting content propagated to said EDS;
    compressing content prior to upload to an EDS;
    extracting at least one item from a compressed body of content;
    providing secure transmission of content between said ESL and said EDS; and
    providing multi-tenant authentication.

19. The method of claim 18, wherein extracting at least one item from a compressed body of content comprises:
    extracting at least one item from a compressed body of content according to instructions from a content owner;
    copying metadata for said at least one extracted item;
    uploading said compressed body of content and said at least one extracted item to said EDS;
    reporting completion of said upload to said content owner and forwarding said copied metadata so that it can be associated to said stored at least one item.

20. The method of claim 16, wherein the at least one functionality not implemented by the EDS further comprises:
    designating content having identical format as "current" or "archival," wherein said current content and said archival content are stored in the same EDS.

21. The method of claim 16, wherein the at least one functionality not implemented by the EDS further comprises:
    storing content in archival format to a first EDS and storing current content at a second EDS.

22. The method of claim 16, wherein the at least one functionality not implemented by the EDS further comprises verifying integrity of content retrieved from said EDS.

23. The method of claim 22, wherein verifying integrity of content retrieved from said EDS comprises the steps of:
    generating a first signature of an item prior to storage of the item;
    generating a second signature of the item after being retrieved; and
    comparing the first and second signatures, wherein if the first and second signatures are the same, integrating of the item has been maintained and if the signatures do not match, the item has been corrupted or modified.

24. The method of claim 16, wherein the at least one functionality not implemented by the EDS further comprises:
    documenting chain of custody of said content;
    performing system event logging; and
    recording audit trails.

\* \* \* \* \*